United States Patent
Helmick et al.

(10) Patent No.: US 12,461,683 B2
(45) Date of Patent: Nov. 4, 2025

(54) SYSTEMS, METHODS, AND DEVICES FOR RECLAIM UNIT FORMATION AND SELECTION IN A STORAGE DEVICE

(71) Applicant: Samsung Electronics Co., Ltd., Suwon-si (KR)

(72) Inventors: Daniel Lee Helmick, Broomfield, CO (US); Chun-Chu Chen-Jhy Archie Wu, San Carlos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/099,250

(22) Filed: Jan. 19, 2023

(65) Prior Publication Data

US 2024/0012580 A1 Jan. 11, 2024

Related U.S. Application Data

(60) Provisional application No. 63/421,994, filed on Nov. 2, 2022, provisional application No. 63/419,699, filed
(Continued)

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/064; G06F 3/0619
(Continued)

(56) References Cited

U.S. PATENT DOCUMENTS 7,184,917 B2 2/2007 Pramanick et al.
7,376,807 B2 5/2008 Moyer
(Continued)

FOREIGN PATENT DOCUMENTS

CN 109783011 A 5/2019
CN 110018966 A 7/2019
(Continued)

OTHER PUBLICATIONS

Bjorling, Matias, "Zoned Namespaces in Practice" Western Digital Corporation, Flash Memory Summit, 2019, 17 pages.
(Continued)

*Primary Examiner* — Hosain T Alam
*Assistant Examiner* — Zubair Ahmed
(74) *Attorney, Agent, or Firm* — Renaissance IP Law Group LLP

(57) ABSTRACT

A storage device may include at least one storage medium and a controller configured to receive a write command, wherein the write command specifies data and a reclaim unit handle, receive information about the data, and store, based on the reclaim unit handle and the information, the data in a reclaim unit of the at least one storage medium. The information may include access information. The information may include error tolerance information. The information may include data attribute information. The information may include data type information. The controller may be configured to determine the information based, at least in part, on the reclaim unit handle. The controller may be configured to receive an indicator that may be separate from the reclaim unit handle, and determine the information based, at least in part, on the indicator.

20 Claims, 19 Drawing Sheets

Related U.S. Application Data on Oct. 26, 2022, provisional application No. 63/358,861, filed on Jul. 6, 2022.

(58) Field of Classification Search
USPC .................................................. 711/154, 100
See application file for complete search history.

(56) References Cited

U.S. PATENT DOCUMENTS

| | | | |
|---|---|---|---|
| 7,610,437 | B2 | 10/2009 | Sinclair et al. |
| 7,716,180 | B2 | 5/2010 | Vermeulen et al. |
| 7,984,084 | B2 | 7/2011 | Sinclair |
| 8,285,918 | B2 | 10/2012 | Maheshwari |
| 8,296,398 | B2 | 10/2012 | Lacapra et al. |
| 8,370,611 | B2 | 2/2013 | Choi et al. |
| 8,443,263 | B2 | 5/2013 | Selinger et al. |
| 8,873,284 | B2 | 10/2014 | Sinclair et al. |
| 9,223,693 | B2 | 12/2015 | Sinclair et al. |
| 9,336,133 | B2 | 5/2016 | Sinclair et al. |
| 9,348,746 | B2 | 5/2016 | Sinclair et al. |
| 9,465,731 | B2 | 10/2016 | Sinclair et al. |
| 9,652,382 | B1 | 5/2017 | Subramanian et al. |
| 9,684,463 | B1* | 6/2017 | Alshinnawi ............ G06F 3/0616 |
| 9,734,050 | B2 | 8/2017 | Sinclair et al. |
| 9,734,911 | B2 | 8/2017 | Sinclair et al. |
| 9,778,855 | B2 | 10/2017 | Sinclair |
| 9,892,803 | B2 | 2/2018 | Reed |
| 9,996,473 | B2 | 6/2018 | Tomlin et al. |
| 10,108,543 | B1 | 10/2018 | Duggal et al. |
| 10,108,544 | B1 | 10/2018 | Duggal et al. |
| 10,120,613 | B2 | 11/2018 | Sinclair et al. |
| 10,133,490 | B2 | 11/2018 | Sinclair et al. |
| 10,176,212 | B1 | 1/2019 | Prohofsky |
| 10,255,179 | B2 | 4/2019 | Ji et al. |
| 10,365,827 | B1 | 7/2019 | Satish et al. |
| 10,430,279 | B1 | 10/2019 | Dittia et al. |
| 10,579,286 | B2 | 3/2020 | Oh et al. |
| 10,739,996 | B1 | 8/2020 | Ebsen et al. |
| 10,795,812 | B1 | 10/2020 | Duggal et al. |
| 10,884,920 | B2 | 1/2021 | Benisty et al. |
| 10,891,228 | B2 | 1/2021 | Steinmacher-Burow |
| 10,903,981 | B1 | 1/2021 | Tian |
| 10,942,852 | B1 | 3/2021 | Tian |
| 10,983,715 | B2 | 4/2021 | Sharoni et al. |
| 11,086,537 | B2 | 8/2021 | Byun |
| 11,200,005 | B2 | 12/2021 | Patel et al. |
| 11,347,409 | B1 | 5/2022 | Randolph et al. |
| 2005/0144358 | A1* | 6/2005 | Conley ............... G06F 12/0246 711/E12.008 |
| 2007/0033325 | A1 | 2/2007 | Sinclair |
| 2007/0198804 | A1 | 8/2007 | Moyer |
| 2008/0082596 | A1 | 4/2008 | Gorobets |
| 2008/0189477 | A1 | 8/2008 | Asano et al. |
| 2009/0313453 | A1 | 12/2009 | Stefanus et al. |
| 2011/0137870 | A1 | 6/2011 | Feder et al. |
| 2011/0145473 | A1 | 6/2011 | Maheshwari |
| 2011/0161784 | A1 | 6/2011 | Selinger et al. |
| 2014/0006688 | A1 | 1/2014 | Yu et al. |
| 2014/0325148 | A1 | 10/2014 | Choi et al. |
| 2014/0365719 | A1 | 12/2014 | Kuzmin et al. |
| 2015/0227602 | A1 | 8/2015 | Ramu et al. |
| 2016/0246713 | A1 | 8/2016 | Choi et al. |
| 2017/0123655 | A1* | 5/2017 | Sinclair .................. G06F 3/061 |
| 2017/0192902 | A1 | 7/2017 | Hwang et al. |
| 2017/0242790 | A1 | 8/2017 | O'Krafka et al. |
| 2017/0300422 | A1 | 10/2017 | Szubbocsev |
| 2018/0189175 | A1 | 7/2018 | Ji et al. |
| 2018/0196743 | A1 | 7/2018 | McVay et al. |
| 2019/0243758 | A1 | 8/2019 | Takeda et al. |
| 2020/0045110 | A1 | 2/2020 | Varnica et al. |
| 2020/0089420 | A1 | 3/2020 | Sharoni et al. |
| 2020/0174671 | A1 | 6/2020 | Margaglia et al. |
| 2020/0192794 | A1 | 6/2020 | Lee |
| 2020/0218653 | A1 | 7/2020 | Ryu |
| 2020/0233612 | A1 | 7/2020 | Dalmatov et al. |
| 2020/0293225 | A1 | 9/2020 | Hsieh et al. |
| 2020/0310686 | A1 | 10/2020 | Truong et al. |
| 2021/0096772 | A1* | 4/2021 | Lee ....................... G06F 3/0673 |
| 2021/0216233 | A1 | 7/2021 | Bolen et al. |
| 2021/0303511 | A1 | 9/2021 | Karr |
| 2021/0303522 | A1 | 9/2021 | Periyagaram et al. |
| 2021/0342362 | A1 | 11/2021 | Haravu et al. |
| 2021/0406216 | A1 | 12/2021 | Komatsu et al. |
| 2022/0091743 | A1 | 3/2022 | Chang et al. |
| 2022/0129378 | A1 | 4/2022 | McJilton et al. |
| 2022/0147392 | A1 | 5/2022 | Choi et al. |

FOREIGN PATENT DOCUMENTS

| | | |
|---|---|---|
| CN | 110134328 A | 8/2019 |
| EP | 2940691 A1 | 11/2015 |
| WO | 2008045839 A1 | 4/2008 |
| WO | 2015175720 A1 | 11/2015 |

OTHER PUBLICATIONS

Marks, Kevin, "An NVM Express Tutorial" Flash Memory Summit, 2013, 92 pages.

NVM Express, "4093-Zone Relative Data Lifetime Hint" NVM Express Technical Proposal for New Feature, 2021, 5 pages.

European Extended Search Report for Application No. 23177191.6, mailed Nov. 8, 2023.

European Extended Search Report for Application No. 23177629.5, mailed Nov. 20, 2023.

European Extended Search Report for Application No. 23180630.8, mailed Nov. 20, 2023.

Ingalls, Sam, "Queue", Jul. 2021, https://www.webopedia.com/definitions/queue/, (Year: 2021), pp. 1-6.

Office Action for U.S. Appl. No. 18/099,246, mailed Mar. 7, 2024.

Final Office Action for U.S. Appl. No. 18/099,246, mailed Aug. 6, 2024.

Office Action for U.S. Appl. No. 18/099,246, mailed Feb. 4, 2025.

European Office Action for Application No. 23177629.5, mailed Mar. 12, 2025.

Final Office Action for U.S. Appl. No. 18/099,246, mailed Jun. 3, 2025.

Office Action for U.S. Appl. No. 18/099,246, mailed Sep. 23, 2025.

\* cited by examiner

SYSTEMS, METHODS, AND DEVICES FOR RECLAIM UNIT FORMATION AND SELECTION IN A STORAGE DEVICE

REFERENCE TO RELATED APPLICATION

This application claims priority to, and the benefit of, U.S. Provisional Patent Application Ser. No. 63/421,994 filed Nov. 2, 2022, Ser. No. 63/358,861 filed Jul. 6, 2022, and Ser. No. 63/419,699 filed Oct. 26, 2022, all of which are incorporated by reference.

TECHNICAL FIELD

This disclosure relates generally to storage devices, and more specifically to systems, methods, and apparatus for reclaim unit formation and selection in a storage device.

BACKGROUND

A storage device such as a solid state drive (SSD) may store data in storage media that may be implemented with nonvolatile memory (NVM). In some nonvolatile memory, data may be updated by erasing the memory in which the data is stored and re-writing new data in the erased memory. Some nonvolatile memory may be written and/or read in units of pages but erased in units of blocks which may include multiple pages. Thus, to update data stored in a page of nonvolatile memory, valid data stored in other pages in the same block may be copied to a different block to prevent loss of the valid data when the block is erased.

The above information disclosed in this Background section is only for enhancement of understanding of the background of the inventive principles and therefore it may contain information that does not constitute prior art.

SUMMARY

A storage device may include at least one storage medium and a controller configured to receive a write command, wherein the write command specifies data and a reclaim unit handle, receive information about the data, and store, based on the reclaim unit handle and the information, the data in a reclaim unit of the at least one storage medium. The information may include access information. The information may include error tolerance information. The information may include data attribute information. The information may include data type information. The controller may be configured to determine the information based, at least in part, on the reclaim unit handle. The controller may be configured to receive an indicator that may be separate from the reclaim unit handle, and determine the information based, at least in pail, on the indicator. The controller may be configured to select the reclaim unit based on the information. The controller may be configured to select the reclaim unit based on a characteristic of at least a portion of the reclaim unit. The characteristic may include a number of program cycles. The characteristic may include an error accumulation characteristic. The controller may be configured to compose the reclaim unit based on the information. The controller may be configured to compose the reclaim unit based on a characteristic of at least a portion of the reclaim unit. The characteristic may include a number of program cycles. The characteristic may include an error accumulation characteristic.

An apparatus may include placement logic configured to send, to a storage device, a write command, wherein the write command specifies data and a reclaim unit handle, wherein the reclaim unit handle may be to reference a reclaim unit in at least one storage medium of the storage device, and send, to the storage device, information about the data. The placement logic may be configured to determine the information based on an operation by a source of the data. The operation may include a write operation. The placement logic may be configured to determine the information based on one or more compaction operations. The placement logic may be configured to determine the information based on one or more data management schemes. The information may include access information. The information may include error tolerance information. The placement logic may be configured to send the information based, at least in part, on the reclaim unit handle. The placement logic may be configured to send the information, at least in part, using an indicator that may be separate from the reclaim unit handle.

A method may include receiving, at a storage device, a write command, wherein the write command specifies data and a reclaim unit handle, receiving, at the storage device, information about the data, and storing, based on the reclaim unit handle and the information, the data in a reclaim unit of at least one storage medium of the storage device. The information may include access information. The information may include error tolerance information. The method may further include selecting, based on the information, the reclaim unit. The selecting may be based on a characteristic of at least a portion of the reclaim unit. The method may further include composing, based on the information, the reclaim unit. The composing may be based on a characteristic of at least a portion of the reclaim unit.

A method may include receiving, at a storage device, a data operation request, wherein the data operation request specifies data and a reclaim unit handle, receiving, at the storage device, information about the data, and performing, based on the data operation request, the reclaim unit handle, and the information, a data operation associated with a reclaim unit of at least one storage medium of the storage device. The data operation request may include a write operation request, and the data operation may include a write operation. The write operation request may include a write command, and the write operation may include storing, based on the reclaim unit handle and the information, the data in the reclaim unit.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1A:
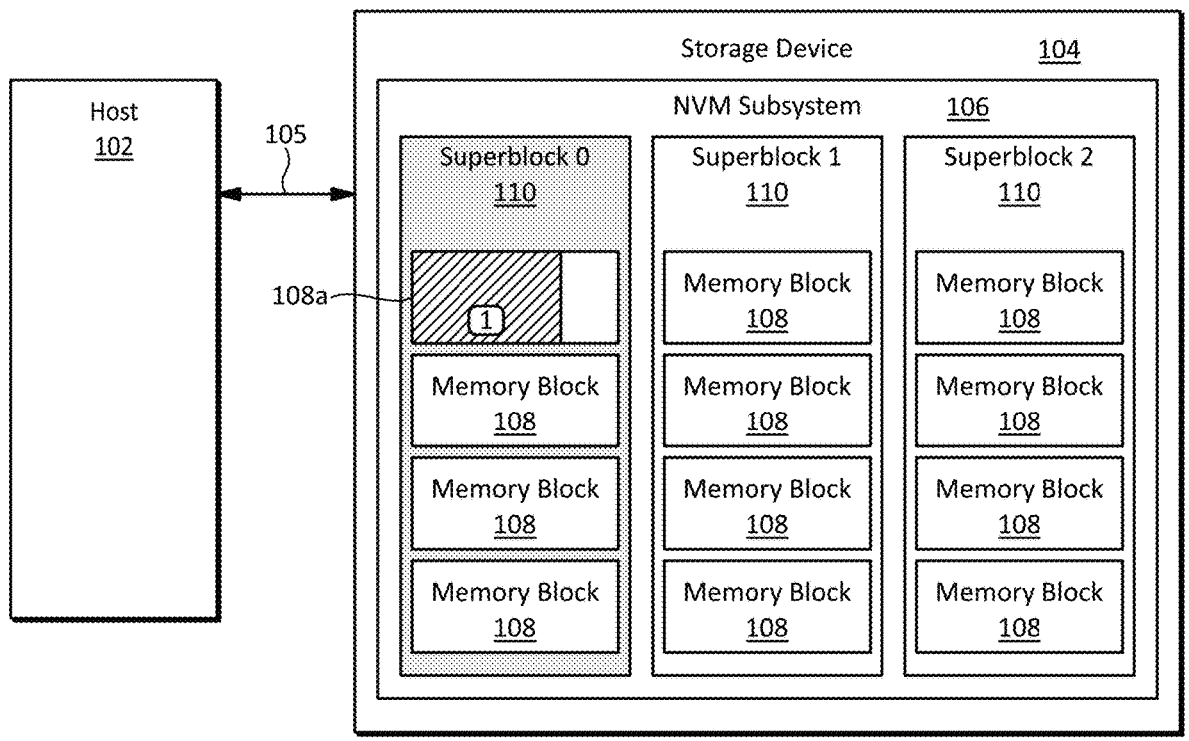
FIG. 1A illustrates an embodiment of a data placement scheme for a storage device in a first data placement state in accordance with example embodiments of the disclosure.

A storage device may implement a flexible data placement (FDP) scheme that may enable a host to arrange data into one or more physical reclaim units (RUs) in the storage device. A reclaim unit may be implemented with a portion of physical storage media (e.g., one or more erase blocks) that may be erased as a unit. This may reduce write amplification, for example, enabling the host to place data that is likely to be deallocated at the same time in the same reclaim unit.

In a flexible data placement scheme, a reclaim unit may appear to a host as a logical representation of storage media. For example, a host may use a reclaim unit handle to reference one or more reclaim units into which the storage device may write data. The storage device may select the actual physical reclaim unit, and/or the storage media used to implement the physical reclaim unit, referenced by the reclaim unit handle. For example, the storage device may select the physical storage media using a round-robin technique, a random selection technique, or a technique that always selects one or more erase blocks with the lowest number of program and/or erase (P/E) cycles to use for the next reclaim unit. These techniques, however, may fail to exploit information about the data (hat may help the storage device select a more beneficial physical storage media for a reclaim unit in which the data is stored.

In a flexible data placement scheme in accordance with example embodiments of the disclosure, a storage device may receive (e.g., from a host) information about data to be stored in a reclaim unit referenced by a reclaim unit handle. The storage device may use the information to select and/or compose a physical reclaim unit in which to store the data. Depending on the implementation details, this may improve or optimize the usage of different reclaim units, erase blocks, and/or the like, in a storage device.

The inventive principles encompass numerous types of information that may be provided to a storage device. For example, a storage device may be provided with access information about data to store in the device. Access information may include, for example: how recently the data has been written, read, and/or the like; how soon the data is expected to be overwritten, read, and/or the like; how frequently the data has been, or is expected to be, written, read, and/or the like; and/or other access information. As another example, a storage device may be provided with information about one or more acceptable characteristics of storage media used to implement a reclaim unit for the data. Acceptable characteristics may include: error tolerance information such as an acceptable bit error rate (BER) which may be specified, for example, based on a length of time the data is stored, a number of read operations, re-write operations (e.g., refresh operations), data movement operations, (e.g., garbage collection (GC) operations), and/or the like; a number of remaining P/E cycles; and/or other acceptable characteristics of storage media. As a further example, a storage device may be provided with information about one or more attributes of data to store in the device. Attribute information may include: service level agreement (SLA) information; quality-of-service (QoS) information; access latency information; access bandwidth information; and/or the like. As another example, a storage device may be provided with information about a type and/or usage of data to be stored such as operating system metadata, file system tables, and/or the like.

The inventive principles encompass numerous techniques for providing information to a storage device about data to store at the device. For example, information may be provided implicitly (e.g., data stored in reclaim units referenced by different, predefined reclaim unit handle numbers may have a different access frequency based on the reclaim unit handle number) and/or explicitly (e.g., a storage device may be provided with a field, extension, and/or the like of a command, handle, and/or the like that may provide explicit information about the data). As another example, information about data may be provided persistently (e.g., information for data in a sequence of write commands may be the same until the information is updated) and/or on an individual basis (e.g., information may be provided for data with each write command). As a further example, information about data to store at a storage device may be provided to the storage device using any communication technique including: as an extension to a reclaim unit handle (e.g., a reclaim unit handle plus an indication of access information); implicitly in a reclaim unit handle number; a setting of a storage device controller; a namespace attribute; with a request for an update operation for a reclaim unit handle; as a configuration setting for a flexible data placement scheme; in a field of an input and/or output I/O or IO) command; in a field of a management command; as an attribute, setting, and/or the like of a nonvolatile memory (NVM) subsystem, controller, namespace, and/or the like.

The inventive principles encompass numerous techniques for a storage device to use information about data to select and/or compose one or more reclaim units in which to store the data. For example, if the information indicates that the data is likely to be written and/or re-written frequently (which may be referred to as hot data), the storage device may select and/or compose a reclaim unit with storage media that may have a relatively large number of P/E cycles remaining in its expected lifetime. As another example, if the information indicates that the data has a relatively high tolerance for errors, for example, because the data may be stored in the storage device as part of a redundant storage scheme (e.g. a redundant array of independent drives RAID) scheme), the storage device may select and/or compose a reclaim unit with storage media that may have a relatively small number of P/E cycles remaining in its expected lifetime. As a further example, a storage device may use information about data to store at the device to select and/or compose a reclaim unit based on one or more of the following attributes of storage media at the drive: wafer production information, erase block location on a storage medium die, voltage and/or speed characteristics of read, write (program), and/or erase operations, bit error accumulation rate, current and/or historical temperature exposure. access activity, and/or the like of the storage media and/or neighboring media, and/or the like.

The inventive principles encompass numerous techniques for identifying, collecting, processing, and/or the like (e.g., by a host), information to send to a storage device (about data to store at the storage device). For example, a host may observe that data written by a user (e.g., an operating system, application, process, and/or the like) may be, or is likely to be, in continuous use and/or has been stored, is likely to be stored, for a relatively long time and may send this information to a storage device, for example, along with a write request. As another example, a host may observe that data written by a user may be, or is likely to be, compacted (e.g., garbage collected) at a file system level, database level and/or the like, and send this information to a storage device, for example, along with a write request. As a further example, a host may determine a number of times data has been compacted (e.g., garbage collected) and send this information to a storage device along with the data to be stored at the device. As an additional example, a host may characterize data usage based on one or more data management schemes such as one or more cache replacement policies, hierarchical storage schemes, multitier storage architectures, and/or the like, and send this information to a storage device along with the data to be stored at the device.

In some embodiments, based on the information about the data, the storage device may select one or more existing reclaim units for a reclaim unit handle, compose one or more reclaim units to use for future write requests, compose one or more reclaim unites to use for a current write request, and/or the like.

This disclosure encompasses numerous inventive principles relating to flexible data placement. The principles disclosed herein may have independent utility and may be embodied individually, and not every embodiment may utilize every principle. Moreover, the principles may also be embodied in various combinations, some of which may amplify some benefits of the individual principles in a synergistic manner.

For purposes of illustration, some embodiments may be described in the context of specific implementation details such as storage devices implemented with solid state drives (SSDs) using not-AND (NAND) flash memory, a Nonvolatile Memory Express (NVMe) protocol, and/or the like. The inventive principles, however, are not limited to these or any other implementation details. For example, some embodiments may implement storage media with flash memory, magnetic media, storage class memory (SCM), and/or the like, or any combination thereof.

In some embodiments in which storage media may be implemented at least partially with flash memory, a reclaim unit may refer to one or more erase blocks, NVM devices (e.g., NVM dies) and/or the like, or any combination thereof, and a reclaim group may refer to one or more reclaim units, one or more NVM device partitions (e.g., planes), one or more NVM devices (e.g., NVM dies), one or more storage devices (e.g., storage drives), and/or the like, or any combination thereof.

In some embodiments in which storage media may be implemented at least partially with magnetic media (e.g., shingled magnetic recording (SMR) media), a reclaim unit may refer to one or more shingle sections, zones, sectors, tracks, and/or the like, or any combination thereof, and a reclaim group may refer to one or more disks (e.g., drives), platters, tracks, zones, sectors, shingle sections, and/or the like, or any combination thereof.

In some embodiments in which storage media may be implemented at least partially with storage class memory (e.g., magnetoresistive random-access memory (MRAM), resistive random-access memory (ReRAM), phase change memory (PCM), cross-gridded nonvolatile memory, memory with bulk resistance change, and/or the like), a reclaim unit may refer to one or more banks, programming groups, and/or the like, or any combination thereof, and a reclaim group may refer to one or more die, banks, programming groups, and/or the like, or any combination thereof.

As another example, the inventive principles are not limited to use with write commands, but may be applied to any type of request for a data operation involving data locality, for instance, in any type of scheme involving data that may be placed based on logical to physical mapping (e.g., a logical representation of physical storage media such as a logical block address to physical block address (LBA-to-PBA or L2P) mapping). For example, a storage device may receive any type of data operation request such as a request for a write operation (e.g., a write inland, write zeros, write ones, write uncorrectable, and/or the like), a copy operation, a deallocate operation (e.g., an unmap, a trim, and/or the like), a sanitize operation, an erase operation, a format operation, a compare and write operation (which may be referred to as a fused command, e.g., a pair of commands that may include a read command to read data for a comparison operation and a write command that may execute based on a result of the comparison operation), an update operation, and/or the like. In some embodiments, a data operation request may include an indication relating to data locality in storage media (e.g., a reclaim unit handle, a reclaim group, and/or the like). Based on receiving a data operation request with an indication relating to data locality in storage media, the storage device may perform a corresponding data operation based on the information relating to data locality in storage media and/or information relating to data to be used in association with the data operation request (e.g., data to be stored based on a write command).

Figure 1B:
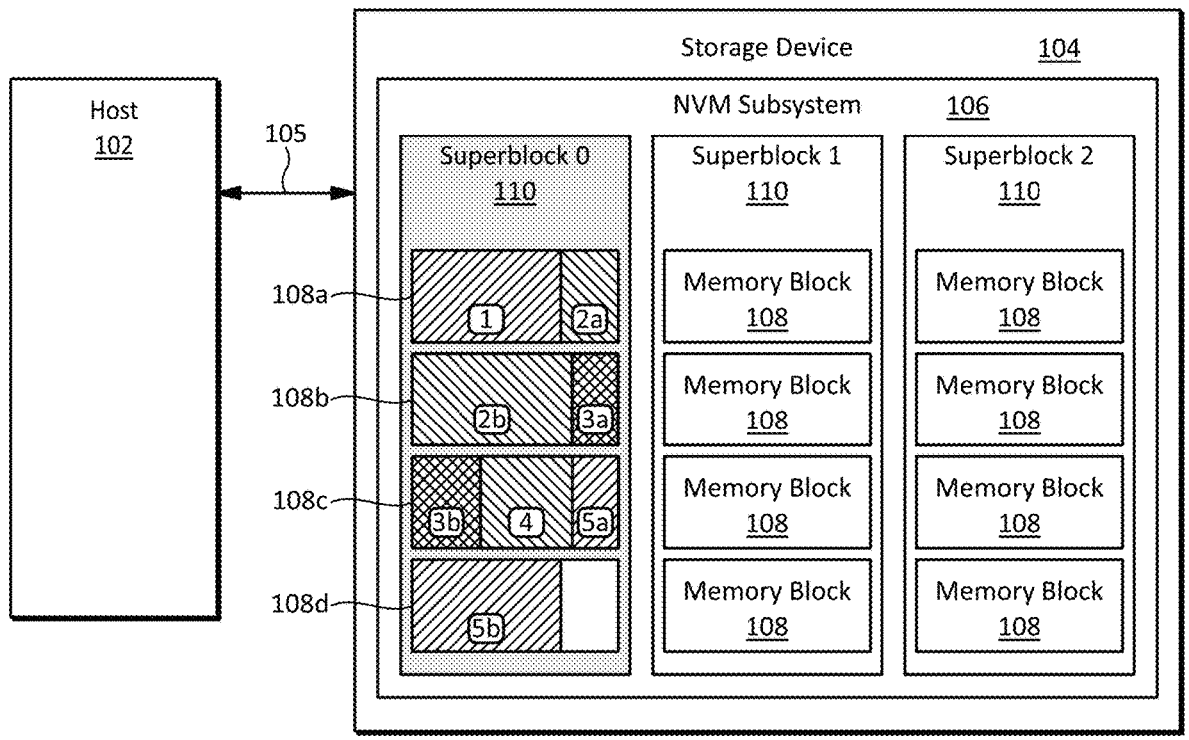
FIG. 1B illustrates the embodiment of the data placement scheme illustrated in FIG. 1A in a second data placement state in accordance with example embodiments of the disclosure.
Figure 1C:
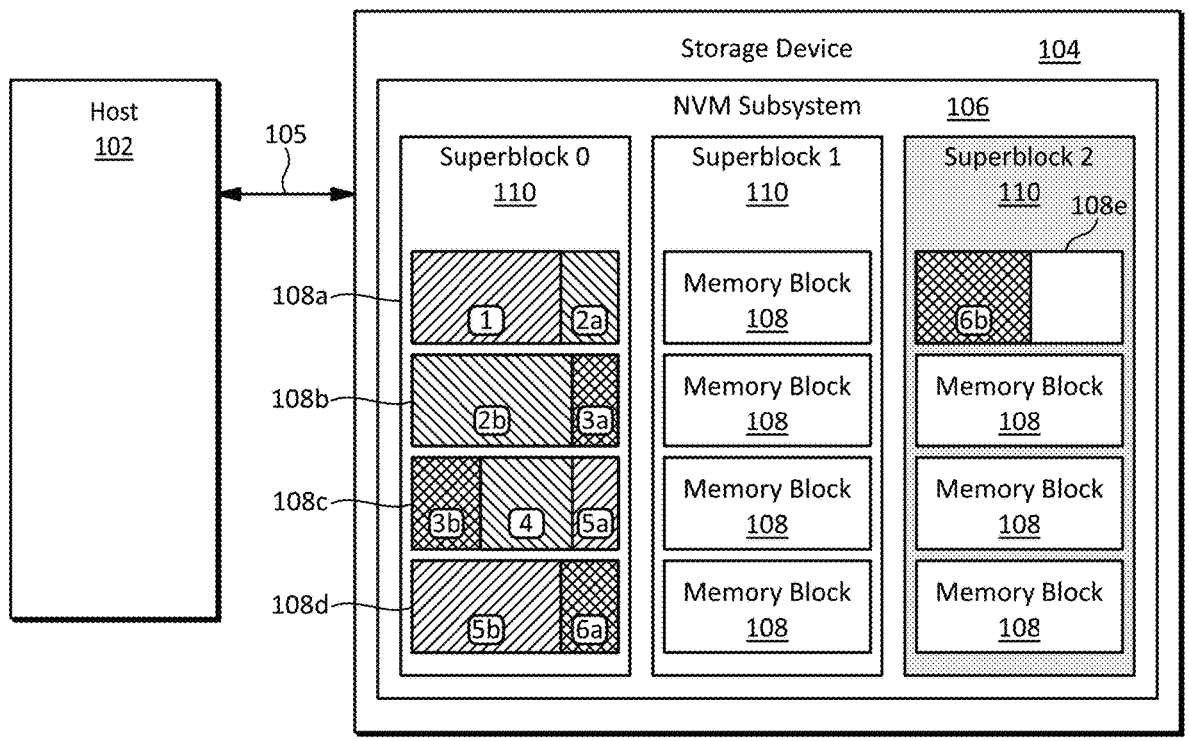
FIG. 1C illustrates the embodiment of the data placement scheme illustrated in FIG. 1A in a third data placement state in accordance with example embodiments of the disclosure.
Figure 1D:
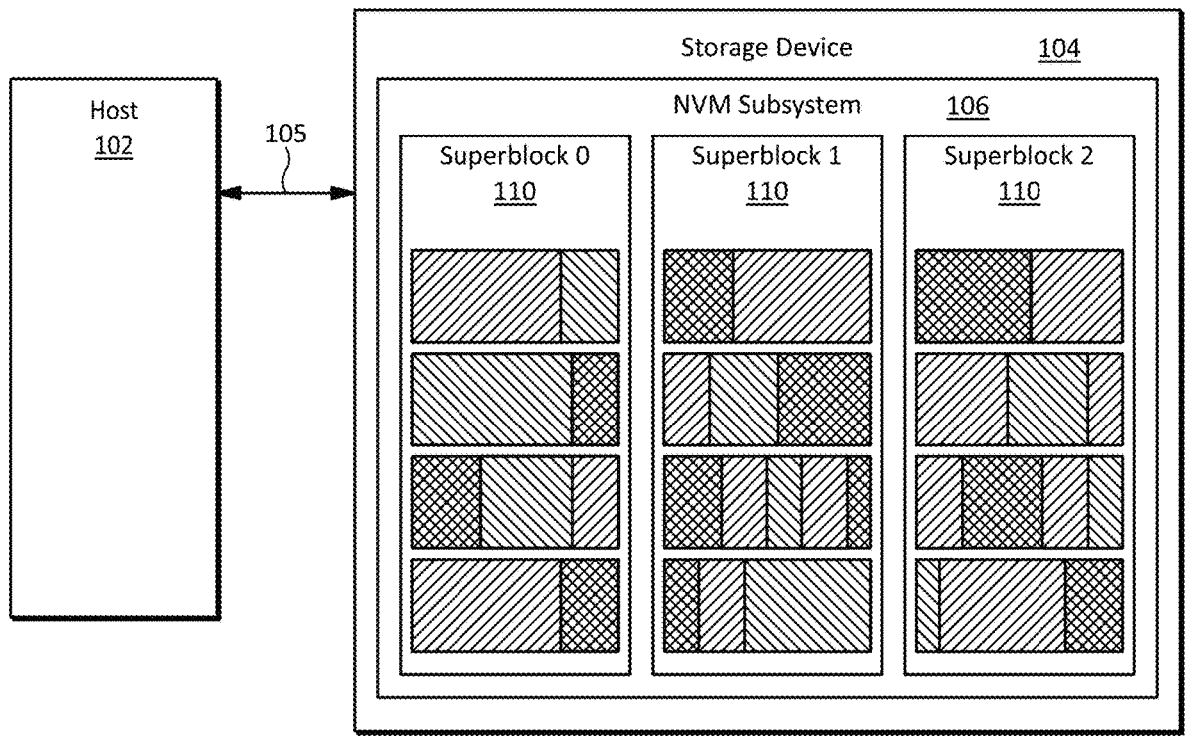
FIG. 1D illustrates the embodiment of the data placement scheme illustrated in FIG. 1A in a fourth data placement state in accordance with example embodiments of the disclosure.
Figure 1E:
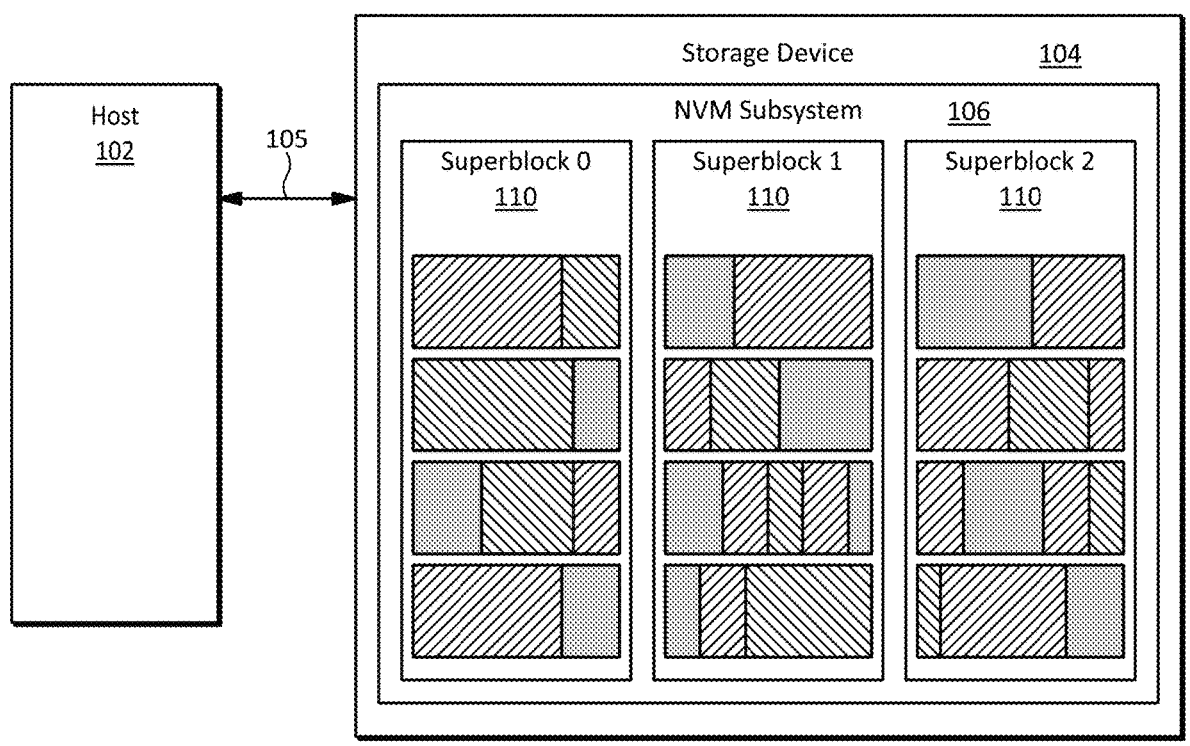
FIG. 1E illustrates the embodiment of the data placement scheme illustrated in FIG. 1A in a fifth data placement state in accordance with example embodiments of the disclosure.

FIG. 1A illustrates an embodiment of a data placement scheme for a storage device in a first data placement state in accordance with example embodiments of the disclosure. FIG. 1B illustrates the embodiment of the data placement scheme illustrated in FIG. 1A in a second data placement state in accordance with example embodiments of the disclosure. FIG. 1C illustrates the embodiment of the data placement scheme illustrated in FIG. 1A in a third data placement state in accordance with example embodiments of the disclosure. FIG. 1D illustrates the embodiment of the data placement scheme illustrated in FIG. 1A in a fourth data placement state in accordance with example embodiments of the disclosure. FIG. 1E illustrates the embodiment of the data placement scheme illustrated in FIG. 1A in a fifth data placement state in accordance with example embodiments of the disclosure.

FIG. 1A, FIG. 1B, FIG. 1C, FIG. 1D, and/or FIG. 1F may be referred to collectively and/or individually as FIG. 1.

The embodiment illustrated in FIG. 1 may include a host 102 and a storage device 104 communicating using a communication connection 105. The storage device 104 may include storage media in an NVM subsystem 106 having memory blocks 108 arrange in superblocks 110. The memory blocks 108 may be implemented with nonvolatile memory that may be erased in units of the blocks illustrated in FIG. 1 and thus may also be referred to as erase blocks.

The memory blocks 108 may be programmed (e.g., written) and/or read in units of pages and/or word lines which may be smaller than memory blocks. The memory blocks 108 may be erased before pages and/or word lines of data may be written into them. The memory blocks 108 may be arranged in superblocks 110, for example, to simplify management of the blocks 108. Thus, the nonvolatile memory illustrated in FIG. 1 may be erased in units of superblocks 110.

The storage device 104 may receive input and/or output (I/O or IO) requests (which may also be referred to as commands) from the host 102 to enable the host to access the NVM subsystem (e.g., write data into the storage media and/or read data from the storage media). The host may divide the data into namespaces indicated by the different types of shading illustrated in FIG. 1. Specifically, data belonging to a first namespace (which may be referred to by namespace identifier 1 (NSID 1)) may be indicated by shading with diagonal lines from top right to bottom left, data belonging to a second namespace (which may be referred to by NSID 2) may be indicated by shading with diagonal lines from top left to bottom right, and data belonging to a third namespace (which may be referred to by NSID 3) may be indicated by diagonal cross-shading. In some embodiments, in addition to namespaces, and/or as an alternative to namespaces, the host 102 may divide and/or arrange the data into groups based on logical block addresses (LBAs), applications that may use the data, host write traffic threads, and/or the like.

Memory blocks 108 may initially be in an erased state as shown by the absence of shading. Prior to receiving write commands, the NVM subsystem 106 may select an erased superblock Superblock 0 indicated by solid shading) into which write data may be placed. The erased superblock may be selected randomly or using a round robin technique. Thus, memory block 108a may initially be empty prior to the NVM subsystem 106 receiving write commands.

Referring to FIG. 1A, the storage device 104 may receive a first write command with write data belonging to NSID 1. The NVM subsystem 106 may place the data belonging to NSID 1 (indicated by the number 1 in a rounded rectangle) in a first memory block 108a of Superblock 0 as illustrated in FIG. 1A. (The number 1 may indicate a sequence in which the data may be placed rather than the NSID.)

Referring to FIG. 1B, the storage device 104 may continue receiving additional write commands from the host 102 with write data belonging to various namespaces. The NVM subsystem 106 may fill the memory blocks 108a-108d in Superblock 0 by placing the write data in the sequence indicated by the numbers in the rounded rectangles. In some cases, the quantity of write data may be larger than the space remaining in a memory block. Thus, a first portion of the write data may be placed so as to fill the remaining space in a first memory block, and a second portion may be placed in an empty memory block. For example, as shown in FIG. 1B, based on receiving a second write command, a first portion 2a of data belonging to NSID 2 may be used to fill the remaining space in memory block 108a, and a second portion 2b of data belonging to NSID 2 may be placed in memory block 108b. The NVM subsystem 106 may continue placing write data into Superblock 0 until Superblock 0 is full or nearly full as shown in FIG. 1B.

Referring to FIG. 1C, the storage device 104 may receive a sixth write command with data belonging to NSID 3 that is too large to fit in the remaining space in memory block 108d in Superblock 0. Thus, the NVM subsystem 106 may select a new empty superblock (e.g., Superblock 2 indicated by solid shading) into which write data may be placed. The NVM subsystem 106 may use a first portion 6*a* of data belonging to NSID 3 to fill the remaining space in memory block 108*d*, and a second portion 6*b* of data belonging to NSID 3 may be placed in memory block 108*e* in Superblock 2. The NVM subsystem 106 may continue placing write data into Superblock 2, and then Superblock 1, with data belonging to different namespaces mixed within one or more superblocks as shown in FIG. 1D. Data belonging to different namespaces may be mixed within blocks 108 and/or superblocks 110, for example, because the host 102 may be unaware of, and/or have no control over, the manner in which the NVM subsystem 106 places data within the blocks 108 and/or superblocks 110.

The host 102 may divide data into namespaces, for example, to provide isolation between sources of data such as applications, processes, logical block address (LBA) range, and/or the like. Thus, the host 102 may deallocate some or all data belonging to a namespace at the same time, for example, when an application terminates.

FIG. 1E illustrates an example in which the host 102 has deallocated data belonging to the namespace indicated as NSID 3 which is shown with solid shading after deallocation. Reusing the deallocated storage space may involve erasing the deallocated storage space. However, because superblocks 110 may be erased as units, the NVM subsystem 106 may move the remaining valid data in a superblock to a different superblock to prevent loss of the valid data when the superblock is erased. Depending on the implementation details, this may result in write amplification that may reduce the useful life of the storage media.

Figure 2A:
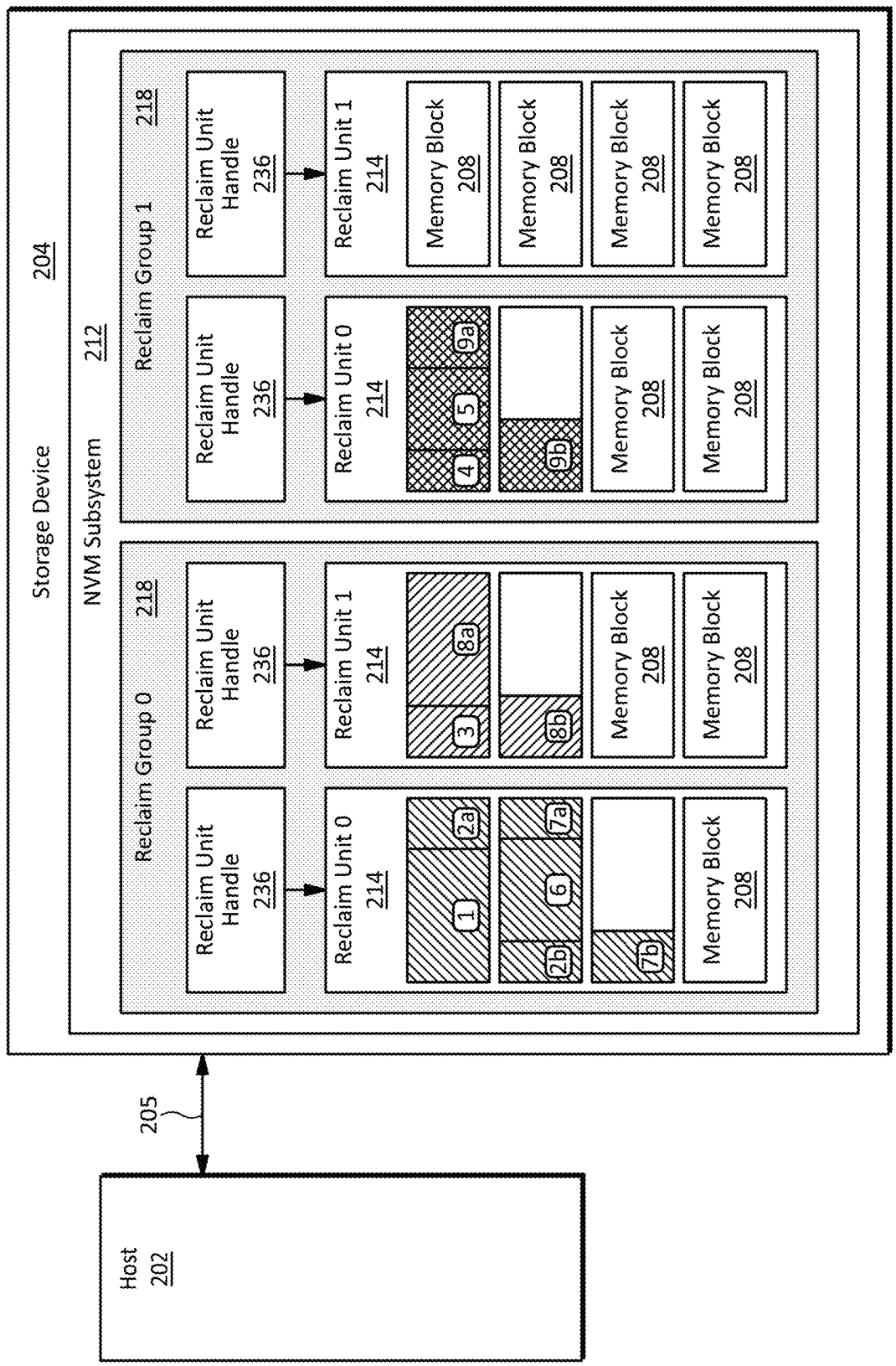
FIG. 2A illustrates an embodiment of a flexible data placement scheme for a storage device in a first data placement state in accordance with example embodiments of the disclosure.
Figure 2B:
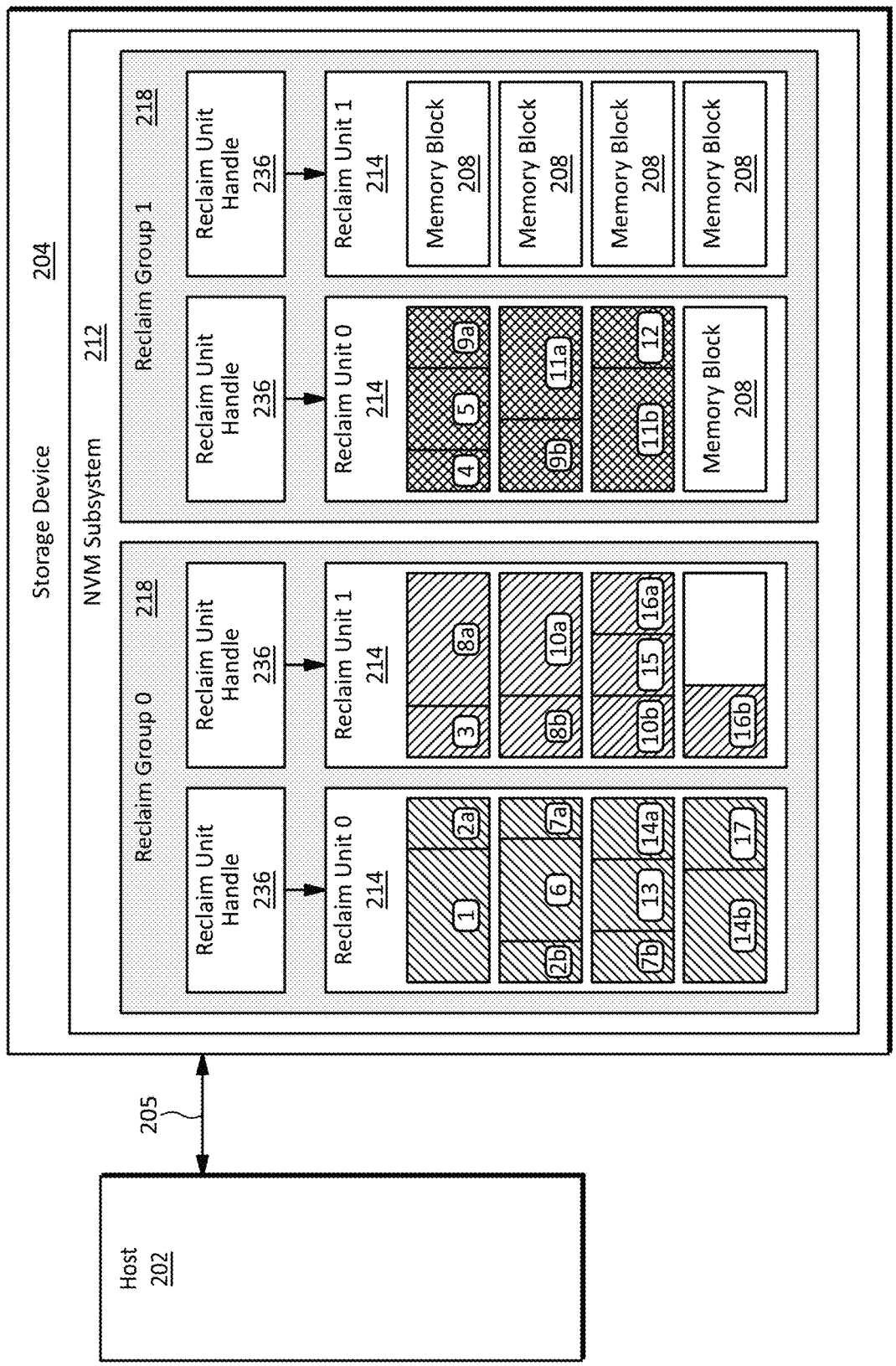
FIG. 2B illustrates the embodiment of the data placement scheme illustrated in FIG. 2A in a second data placement state in accordance with example embodiments of the disclosure.
Figure 2C:
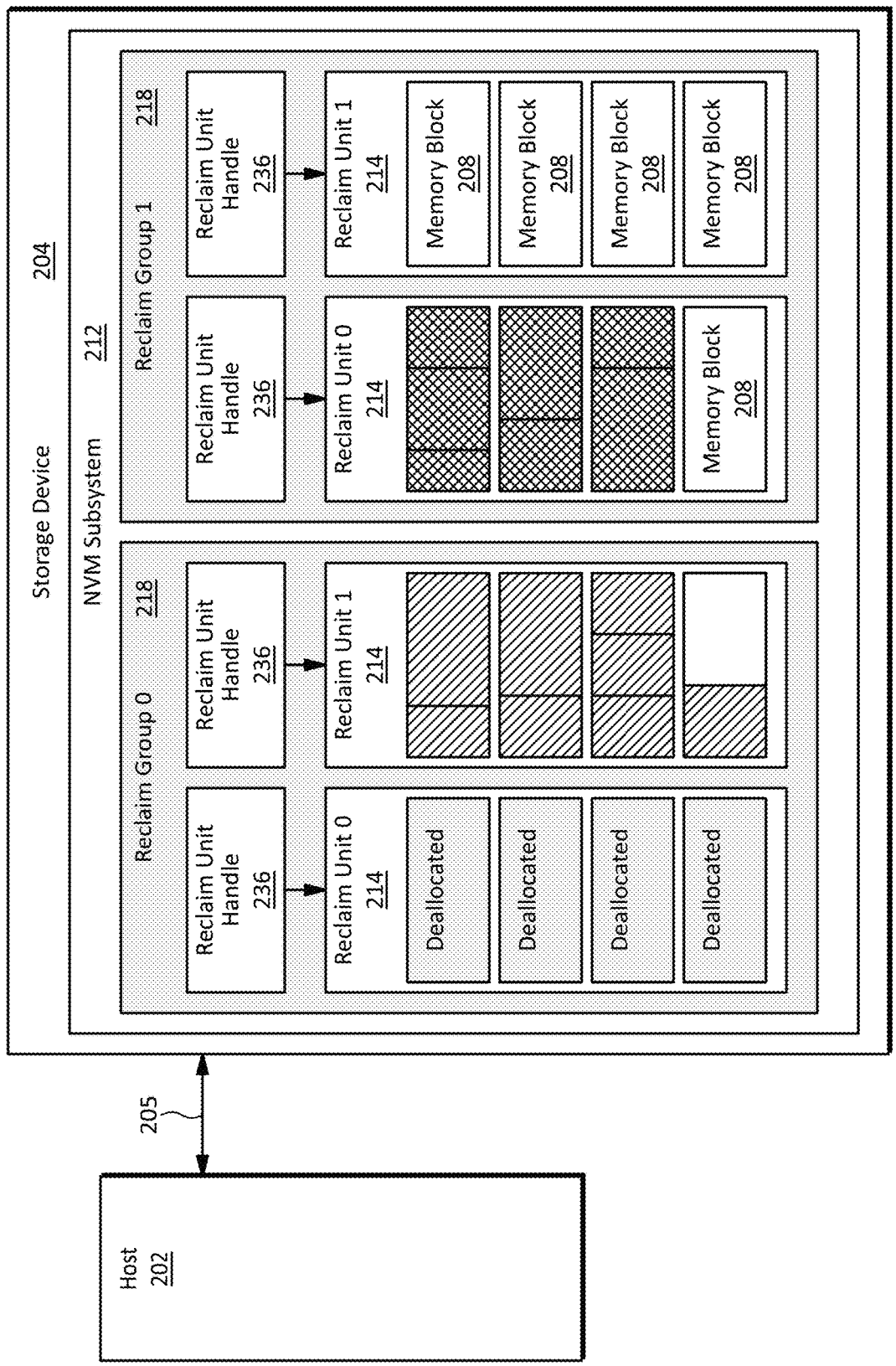
FIG. 2C illustrates the embodiment of the data placement scheme illustrated in FIG. 2A in a third data placement state in accordance with example embodiments of the disclosure.
Figure 2D:
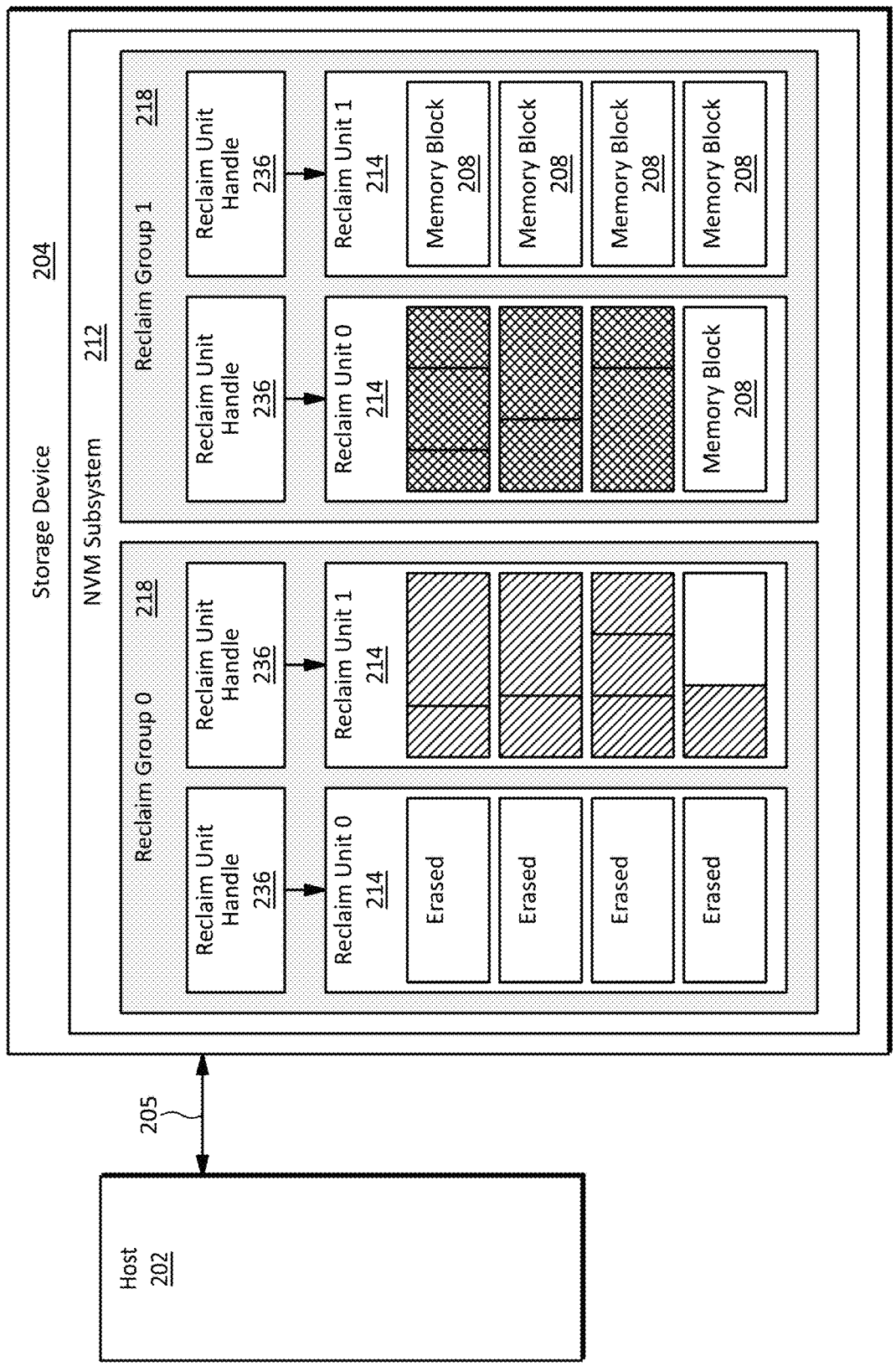
FIG. 2D illustrates the embodiment of the data placement scheme illustrated in FIG. 2A in a fourth data placement state in accordance with example embodiments of the disclosure.

FIG. 2A illustrates an embodiment of a flexible data placement scheme for a storage device in a first data placement state in accordance with example embodiments of the disclosure. FIG. 2B illustrates the embodiment of the data placement scheme illustrated in FIG. 2A in a second data placement state in accordance with example embodiments of the disclosure. FIG. 2C illustrates the embodiment of the data placement scheme illustrated in FIG. 2A in a third data placement state in accordance with example embodiments of the disclosure. FIG. 2D illustrates the embodiment of the data placement scheme illustrated in FIG. 2A in a fourth data placement state in accordance with example embodiments of the disclosure.

FIG. 2A, FIG. 2B, FIG. 2C, and/or FIG. 2D may be referred to collectively and/or individually as FIG. 2.

The embodiment illustrated in FIG. 2 may include some components such as a host 202, a storage device 204, a communication connection 205, and/or memory blocks 208 which, in some aspects, may operate in a manner similar to the corresponding components in the embodiment illustrated in FIG. 1. However, in the embodiment illustrated in FIG. 2, memory blocks 208 in the NVM subsystem 212 may be arranged in one or more reclaim units 214 that may be erased as a unit and may include one or more memory blocks 208. A reclaim unit 214 may be implemented, for example with one or more erase blocks, superblock, and/or the like. Moreover, the reclaim units 214 may be identified by corresponding reclaim unit handles 236 that may enable the host 202 to specify (e.g., in a field of a write command) a specific reclaim unit 214 to use for storing the write data associated with the write command. In some embodiments, some or all of the reclaim units 214 may be arranged in one or more reclaim groups 218 which the host may also specify, for example, using one or more corresponding reclaim group identifiers (e.g., in a field of a write command). In some embodiments, a reclaim unit handle 236 may identify more than one reclaim unit 216. For example, a reclaim unit handle 236 may identify (e.g., map to) one or more reclaim units 216 in one or more (e.g., each) reclaim group 218 (e.g., in a manner similar to that illustrated in FIG. 5.)

Thus, by specifying specific reclaim units 214 and/or reclaim groups 218 to use for storing data associated with write commands, the host 202 may cause the NVM subsystem 212 to only store data belonging to one or more specific namespaces in one or more reclaim units 214 and/or reclaim groups 218.

For example, referring to FIG. 2A, the host 202 may instruct the NVM subsystem 212 to store data belonging to namespaces indicated by NSID 1, NSID 2, and NSID 3 in Reclaim Unit 0, Reclaim Unit 1, and Reclaim Unit 2, respectively, in the sequence indicated by the numbers in the rounded rectangles in FIG. 2 and indicated by the numbers in brackets as follows. For example, data [1] for a first write command associated with NSID 1 may be written to a first portion of the top memory block 208 of Reclaim Unit 0 of Reclaim Group 0. A first portion of data [2a] for a second write command associated with NSID 1 may be written in the remaining portion of the top memory block 208 of Reclaim Unit 0 of Reclaim Group 0, and a second portion of data [2b] for the second write command associated with NSID 1 may be written in a first portion of the second memory block 208 from the top of Reclaim Unit 0 of Reclaim Group 0. Data [3] for a third write command associated with MID 2 may be written to a first portion of the top memory block 208 of Reclaim Unit 1 of Reclaim Group 0. Data [4] for a fourth write command associated with NSID 3 may be written to a first portion of the top memory block 208 of Reclaim Unit 0 of Reclaim Group 1. Data [5] for a fifth write command associated with NSID 3 may be written to a next portion of the top memory block 208 of Reclaim Unit 0 of Reclaim Group 1. Data [6] for a sixth write command associated with NSID 1 may be written to a next portion of the second memory block 208 from the top of Reclaim Unit 0 of Reclaim Group 0. A first portion of data [7a] for a seventh write command associated with NSID 1 may be written in the remaining portion of the second memory block 208 from the top of Reclaim Unit 0 of Reclaim Group 0, and a second portion of data [7b] for the seventh write command associated with NSID 1 may be written in a first portion of the third memory block 208 from the top of Reclaim Unit 0 of Reclaim Group 0. A first portion of data [8a] for an eighth write command associated with NSID 2 may be written in the remaining portion of the top memory block 208 of Reclaim Unit 1 of Reclaim Group 0, and a second portion of data [8b] for the eighth write command associated with NSID 2 may be written in a first portion of the second memory block 208 from the top of Reclaim Unit 1 of Reclaim Group 0. A first portion of data [9a] for a ninth write command associated with NSID 3 may be written in the remaining portion of the top memory block 208 of Reclaim Unit 0 of Reclaim Group 1, and a second portion of data [9b] for the ninth write command associated with NSID 3 may be written in a first portion of the second memory block 208 from the top of Reclaim Unit 0 of Reclaim Group 1.

Referring to FIG. 2B, the host 202 may continue sending write commands and associated write data that it may instruct the NVM subsystem 212 to store in reclaim units corresponding to the respective namespaces using write commands in the sequence indicated by the numbers in the rounded rectangles which may correspond to data for the associated write commands.

Referring to FIG. 2C, the host may deallocate some or all of the data belonging to NSID 1 as shown by solid shading. For example, the data associated with any of the first, second, sixth, seventh, thirteenth, fourteenth, and/or seventeenth write commands may be deallocated at different times (with various amounts of time therebetween), in various combinations at different times, or all at once. Depending on the implementation details, this may enable the NVM subsystem 212 to erase Reclaim Unit 0 (as shown without shading in FIG. 2D) without moving data belonging to other namespaces, thereby reducing or eliminating write amplification. Although FIG. 2D may illustrate a reclaim unit handle 236 referencing a reclaim unit 214 having one or more memory blocks 208 that may be erased, in some embodiments, one or more deallocated memory blocks 208 may be returned to a pool of available memory prior to being erased. Thus, in some embodiments, the memory blocks 208 indicated as being erased in FIG. 2D may not be the same memory blocks indicated as being deallocated in FIG. 2C but instead may be other memory blocks that may have previously been erased (e.g., when it was in a pool of free blocks and/or not referenced by a reclaim unit handle 236) and arranged into a new (e.g., empty) reclaim unit 214. In some embodiments, in addition to namespaces, and/or as an alternative to namespaces, data may be divided and/or arranged into groups based on logical block addresses (LBAs), applications that may use the data, host write traffic threads, and/or the like.

Figure 3A:
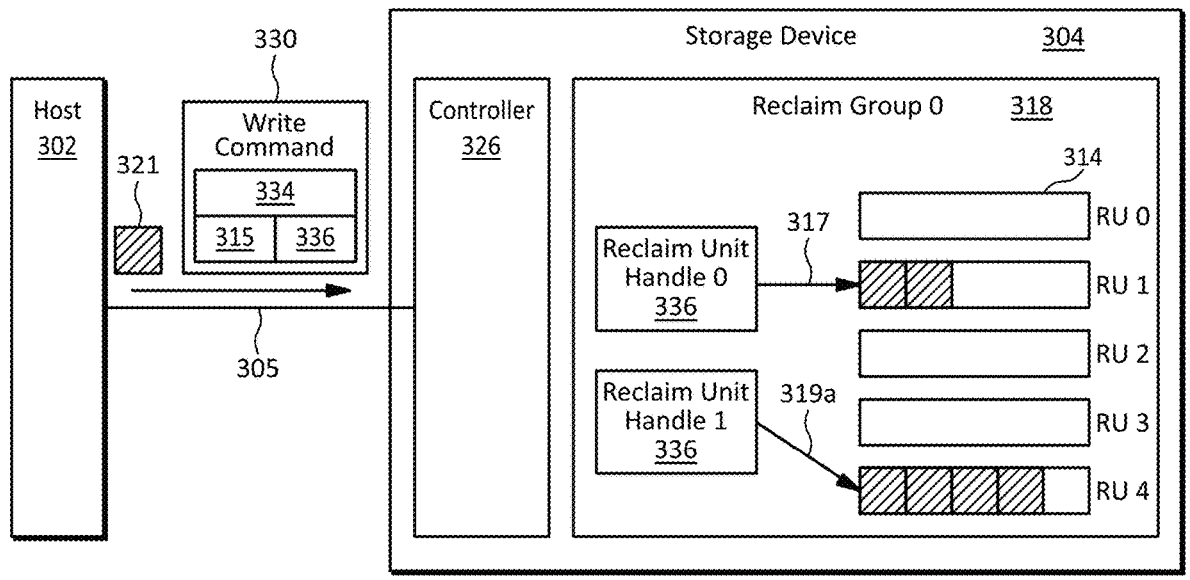
FIG. 3A illustrates an embodiment of a flexible data placement scheme with reference modification in a first data placement state in accordance with example embodiments of the disclosure.
Figure 3B:
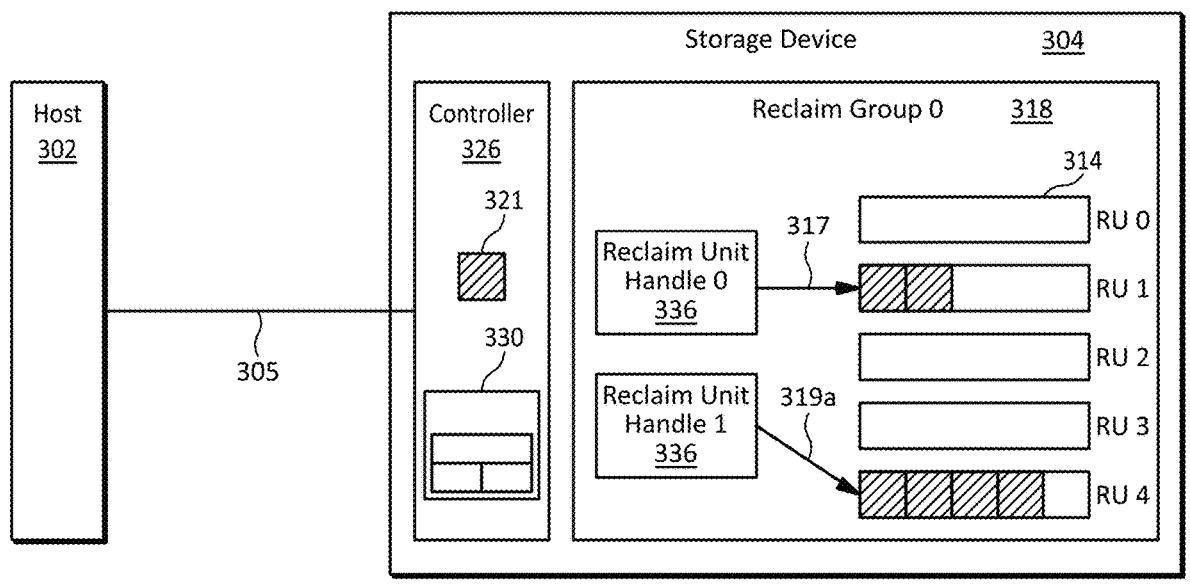
FIG. 3B illustrates the embodiment of the data placement scheme illustrated in FIG. 3A in a second data placement state in accordance with example embodiments of the disclosure.
Figure 3C:
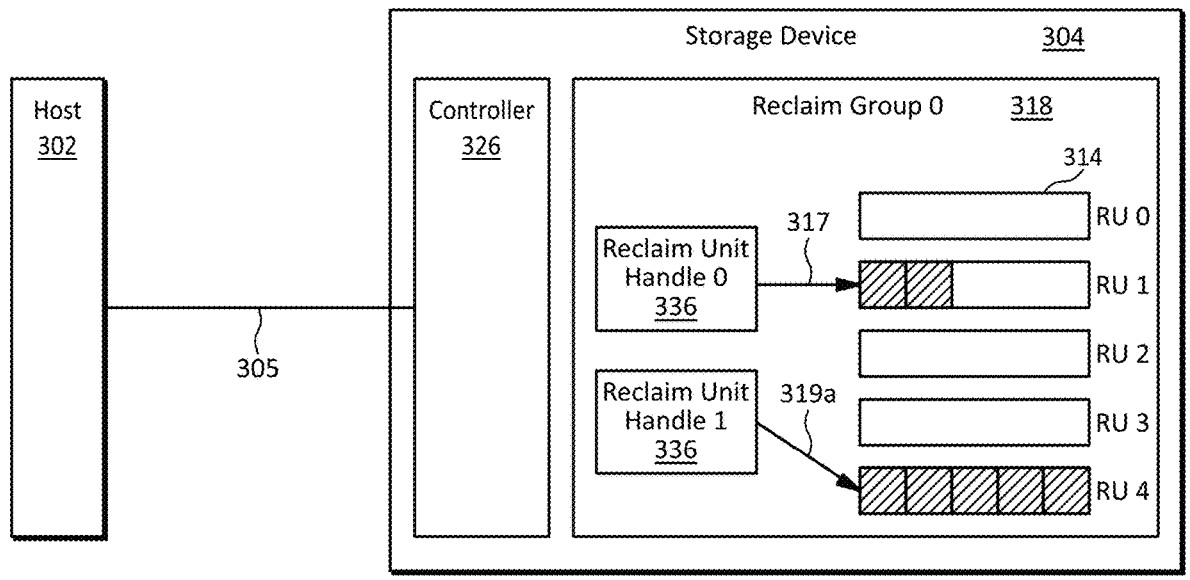
FIG. 3C illustrates the embodiment of the data placement scheme illustrated in FIG. 3A in a third data placement state in accordance with example embodiments of the disclosure.
Figure 3D:
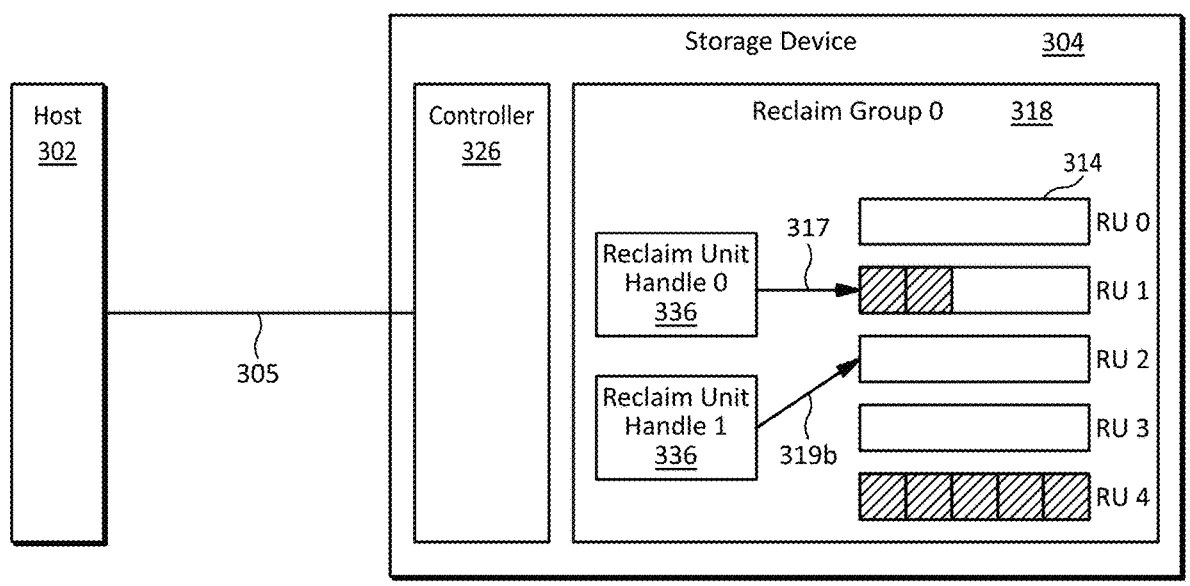
FIG. 3D illustrates the embodiment of the data placement scheme illustrated in FIG. 3A in a fourth data placement state in accordance with example embodiments of the disclosure.

FIG. 3A illustrates an embodiment of a flexible data placement scheme with reference modification in a first data placement state in accordance with example embodiments of the disclosure. FIG. 3B illustrates the embodiment of the data placement scheme illustrated in FIG. 3A in a second data placement state in accordance with example embodiments of the disclosure. FIG. 3C illustrates the embodiment of the data placement scheme illustrated in FIG. 3A in a third data placement state in accordance with example embodiments of the disclosure. FIG. 3D illustrates the embodiment of the data placement scheme illustrated in FIG. 3A in a fourth data placement state in accordance with example embodiments of the disclosure. FIG. 3A, FIG. 3B, FIG. 3C, and/or FIG. 3D may be referred to collectively and/or individually as FIG. 3.

The embodiment illustrated in FIG. 3 may include a host 302 and a storage device 304 communicating using a communication connection 305. The storage device 304 may include a controller 326 (which may control the overall operation of the storage device 304) and storage media including reclaim units 314 arranged in one or more reclaim groups 318. One reclaim group 318 referred to as Reclaim Group 0 is illustrated in FIG. 3, but the reclaim units 314 may be arranged in any number of reclaim groups 318. For purposes of illustration, in the embodiment illustrated in FIG. 3, Reclaim Group 0 may include five reclaim units 314 identified as RU 0, RU 1, RU 2, RU 3, and RU 4, each of which may have a storage capacity of five pages of data, but any number and/or size of reclaim units may be used. For example, in a practical implementation, a reclaim unit may include one, two, four, or more erase blocks, each of which may have a storage capacity measured in MB or GB and page size measured in KB.

One or more reclaim unit handles 336 may reference corresponding reclaim units 314. For example, as shown in FIG. 3A, a first reclaim unit handle 336 identified as Reclaim Unit Handle 0 (or RUH 0) may reference RU 1 as indicated by arrow 317. A second reclaim unit handle 336 identified as Reclaim Unit Handle 1 (RUH 1) may reference RU 4 as indicated by arrow 319a.

Referring to FIG. 3A, the storage device 304 may be shown in an initial state in which two pages of data may be stored in the reclaim unit 314 identified as RU 1, and four pages of data may be stored in the reclaim unit 314 identified as RU 4 as shown by the diagonal shaded portions of RU 1 and RU 4.

The host 302 may send a write command 330 and a page of data 321 (or an address, pointer, or other indicator of a location of the page of data 321) to the storage device 304 using communication connection 305. The command 330 may include a placement identifier 334 that may include a reclaim group identifier 315 and/or reclaim unit handle 336. In the example illustrated in FIG. 3, the reclaim group identifier 315 and reclaim unit handle 336 may instruct the storage device 304 to store the page of data 321 at the reclaim unit 314 referenced by Reclaim Unit Handle 1 in Reclaim Group 0.

In some embodiments, the command 330 and/or the placement identifier 334 may use a different technique to specify a reclaim unit into which the data 321 is to be written. For example, rather than directly provide a reclaim unit handle 336, the command 330 and/or placement identifier 334 may include a placement handle that may specify a reclaim unit handle, for example, as illustrated in the embodiment described with respect to FIG. 4.

Referring to FIG. 3B, the controller 326 may receive the write command 330 and/or page of data 321. Based on the reclaim group identifier 315 and reclaim unit handle 336 in the placement identifier 334 included in the write command 330, the controller 326 may determine that the page of data 321 should be stored in the reclaim unit 314 referenced by Reclaim Unit Handle 1 in Reclaim Group 0. In the example illustrated in FIG. 3B, Reclaim Unit Handle 1 may reference the reclaim unit 314 identifies as RU 4, and thus, the controller 326 may store the page of data 321 in RU 4 as shown in FIG. 3C.

Referring to FIG. 3D, the page of data 321 may have filled the reclaim unit 314 indicated as RU 4 as shown with diagonal shading. Thus, the controller 326 may modify the Reclaim Unit Handle 1 to reference a different (e.g., empty) reclaim unit 314 within Reclaim Group 0 such as RU 2 as shown by arrow 319b. The controller 326 may then proceed to fill RU 2 with data received from the host using write commands 330 that specify Reclaim Unit Handle 1 in the placement identifier 334.

Figure 4A:
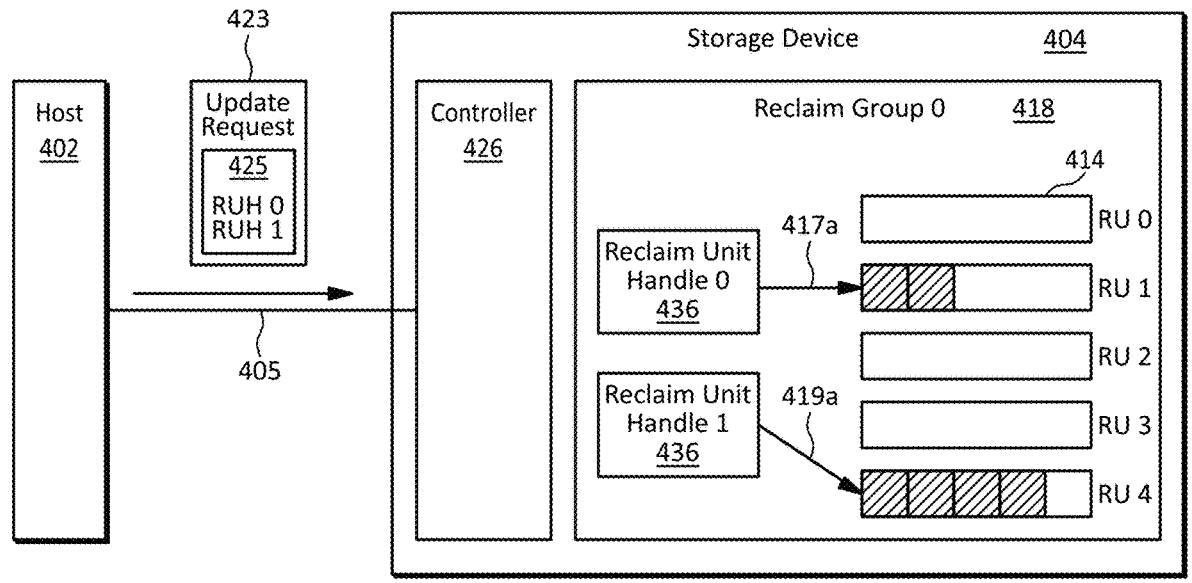
FIG. 4A illustrates an embodiment of an update operation for a flexible data placement scheme in a first state in accordance with example embodiments of the disclosure.
Figure 4B:
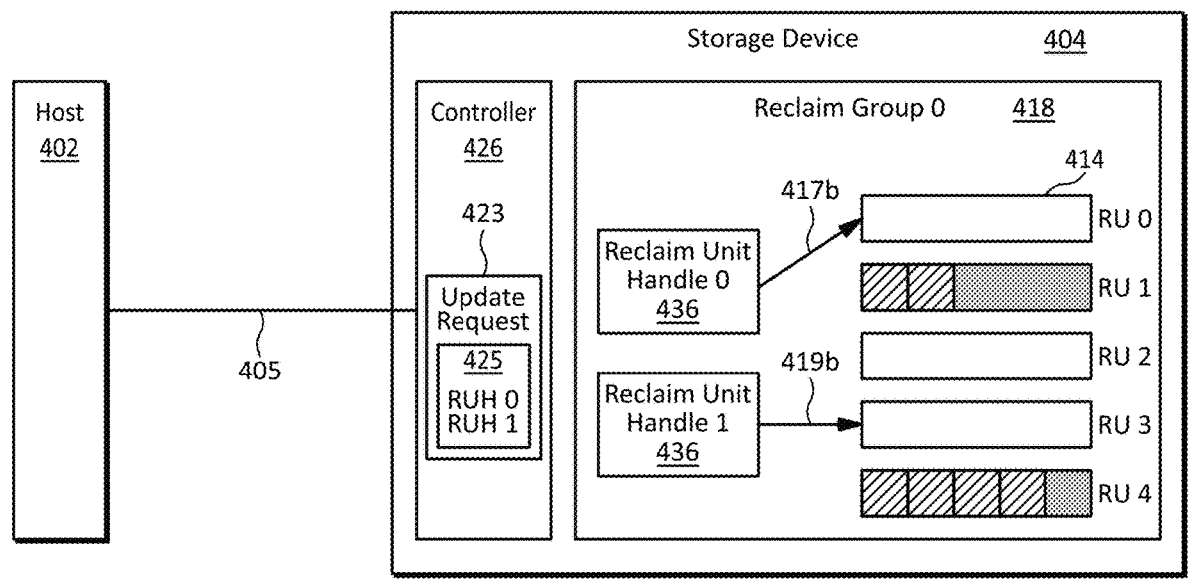
FIG. 4B illustrates the embodiment of the update operation illustrated in FIG. 4A in a second state in accordance with example embodiments of the disclosure.

FIG. 4A illustrates an embodiment of an update operation for a flexible data placement scheme in a first state in accordance with example embodiments of the disclosure. FIG. 4B illustrates the embodiment of the update operation illustrated in FIG. 4A in a second state in accordance with example embodiments of the disclosure. FIG. 4A and FIG. 4B may be referred to collectively and/or individually as FIG. 4.

The embodiment illustrated in FIG. 4 may include a host 402 and a storage device 404 communicating using a communication connection 405. The storage device 404 may include a controller 426, which may control the overall operation of the storage device 404, and storage media including reclaim units 414 arranged in one or more reclaim groups 418.

One reclaim group 418 referred to as Reclaim Group 0 is illustrated in FIG. 4, but the reclaim units 414 may be arranged in any number of reclaim groups 418. For purposes of illustration, in the embodiment illustrated in FIG. 4, Reclaim Group 0 may include five reclaim units 414 identified as RU 0, R U 1, RU 2, RU 3, and RU 4, each of which may have a storage capacity of five pages of data, but any number and/or size of reclaim units may be used. For example, in a practical implementation, a reclaim unit may include one, two, four, or more erase blocks, each of which may have a storage capacity measured in MB and page size measured in KB.

One or more reclaim unit handles 436 may reference corresponding reclaim units 414. For example, Reclaim Unit Handle 0 (RUH 0) may reference reclaim unit RU 1 as indicated by arrow 417*a*, and Reclaim Unit Handle 1 (RUH 1) may reference reclaim unit RU 4 as indicated by arrow 419*a*. A reclaim unit handle 436 may reference a reclaim unit 414 in which the controller may store the next page of data using the reclaim unit handle 436.

Referring to FIG. 4A, the storage device 404 may be shown in an initial state in which two pages of data may be stored in the reclaim unit 414 identified as RU 1, and four pages of data may be stored in the reclaim unit 414 identified as RU 4 as shown by the diagonal shaded portions of RU 1 and RU 4. Thus, the storage device 404 may be shown in an initial state that may be similar to the initial state of storage device 304 in FIG. 3A.

Rather than receiving a write command, however, the controller 426 may receive an update request 423 (e.g., using a command, directive, and/or the like). The update request 423 may request an update operation in which the controller 426 may modify one or more reclaim unit handles 436 to reference a new (e.g., empty) reclaim unit 414. The update request 423 may include an update list 425 that may specify one or more reclaim unit handles 436 that may be modified by the update operation. In the example illustrated in FIG. 4A, the update list 425 may include Reclaim Unit Handle 0 and Reclaim Unit Handle 1. In some embodiments, the update request 423 may use a different technique to specify one or more reclaim handles 436 that may be updated. For example, rather than directly provide a reclaim unit handle 436 the update request 423 may include a placement handle that may specify a reclaim unit handle, for example, as illustrated in the embodiment described with respect to FIG. 5.

Referring to FIG. 4B, the controller 426 may perform the requested update operation by modifying Reclaim Unit Handle 0 to reference reclaim unit RU 0 as shown by arrow 417*b*, and by modifying Reclaim Unit Handle 1 to reference reclaim unit RU 3 as shown by arrow 419*b*. Thus, data sent with subsequent write commands specifying Reclaim Unit Handle 0 or Reclaim Unit Handle 1 may be written to RU 0 or RU 3, respectively.

As illustrated in FIG. 4B, reclaim units RU 1 and RU 4 may be only partially full after an update operation. However, depending on the physical storage media used to implement the reclaim units 414, leaving a reclaim unit partially full may reduce the reliability, durability, performance, and/or the like, of the reclaim unit and/or the storage media with which it is implemented. Therefore, in the embodiment illustrated in FIG. 4B, the controller 426 may fill some or all of the empty portions of RU 1 and/or RU 4 with fill data such as zeros, random data, and/or metadata as shown with solid shading.

The use of fill data, however, may result in wasted or underutilized storage space. For example, the portions of RU 1 and/or RU 4 shown with fill data in FIG. 4B may not be used to store data until they are reclaimed, for example, by a garbage collection operation.

Figure 5:
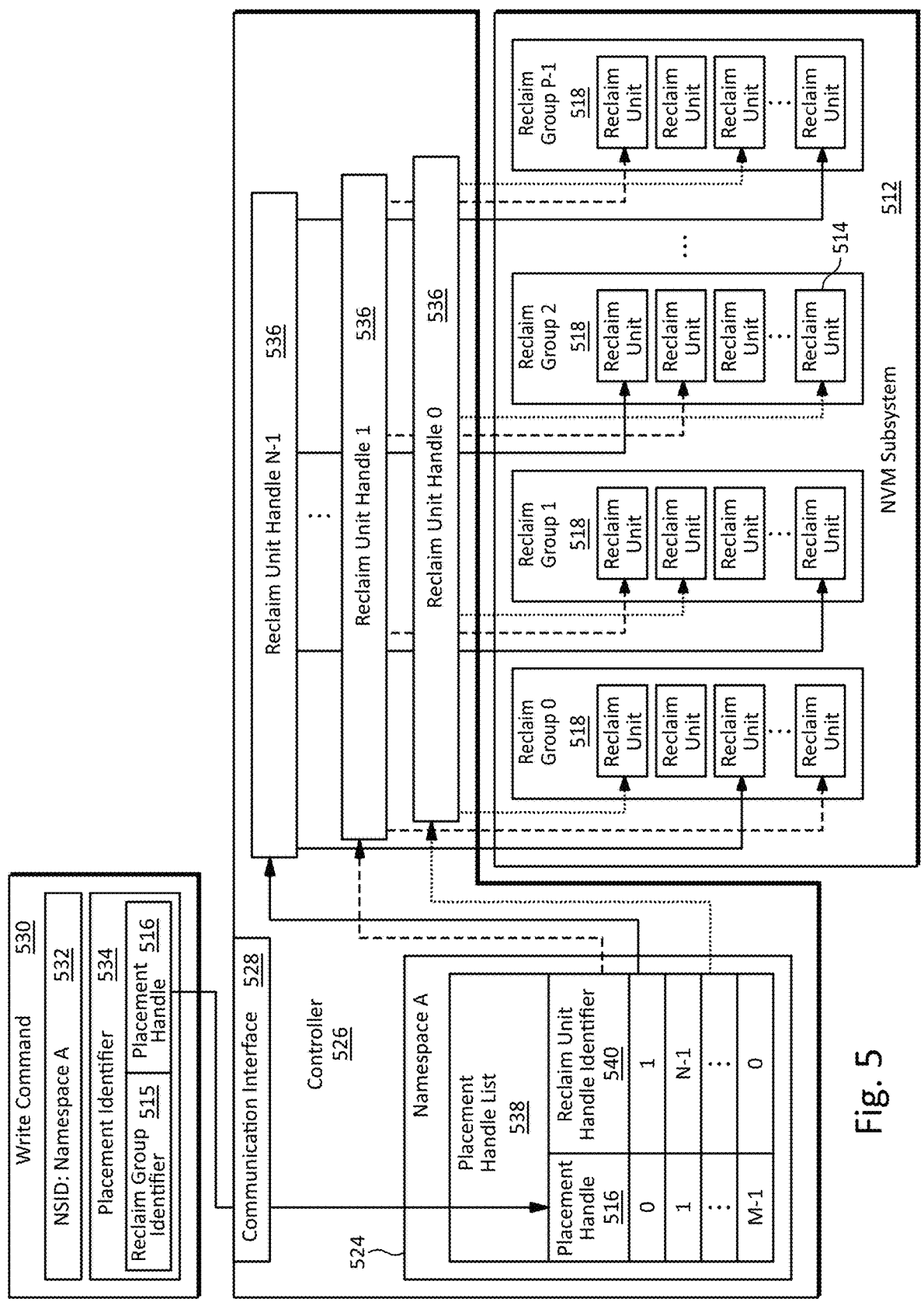
FIG. 5 illustrates an embodiment of a flexible data placement scheme having reclaim unit handles in accordance with example embodiments of the disclosure.

FIG. 5 illustrates an embodiment of a flexible data placement scheme having reclaim unit handles in accordance with example embodiments of the disclosure. The embodiment illustrated in FIG. 5 may include a controller 526 and an NVM subsystem 512 that may be located, for example, in a storage device. The NVM subsystem 512 may include P reclaim groups 518 identified as Reclaim Group 0 through Reclaim Group P-1. A reclaim group 518 may include one or more reclaim units 514.

The controller 526 may receive I/O commands 530 from a host through a communication interface 528. An I/O command 530, which in the example illustrated in FIG. 5 may be a write command, may include a namespace identifier (NSID) 532 and/or a placement identifier 534. The placement identifier 534 may include a reclaim group identifier 515 and/or a placement handle 516 that may enable a host to specify a reclaim group 518 and/or a reclaim unit 514, respectively, within the reclaim group 518 to use to store data associated with the write command 530. Thus, in some embodiments, the scheme illustrated in FIG. 5 may enable a host to align data that may be deallocated together (e.g., data belonging to a namespace) with one or more reclaim units 514 that may be erased as units.

In some embodiments, rather than directly indicating one of the reclaim units 514, the placement handle 516 may map to a reclaim unit handle (RUH) 536 that may reference one or more reclaim units 514 in one or more reclaim groups 518. For example, a reclaim unit handle may map to one reclaim unit 514 in each reclaim group 518. (FIG. 5 shows example mappings from each reclaim unit handle 536 to one reclaim unit in each reclaim group 518.) In the embodiment illustrated in FIG. 5, the controller may use N reclaim unit handles 536 identified as Reclaim Unit Handle 0 through Reclaim Unit Handle N-1. In some embodiments, the reclaim unit handles 536 may be characterized as a controller resource.

The controller 526 may use a placement handle list 538 to map one or more placement handles 516 to one or more RUH identifiers (RUH IDs) 540, which in turn may identify a corresponding reclaim unit handle 536. In the embodiment illustrated in FIG. 5, the placement handle list 538 may include M placement handles identified as Placement Handle 0 through Placement Handle M-1.

In some embodiments, a placement handle 516 may be scoped to a namespace 524 (in this example, a namespace identified as Namespace A). The namespace may, in turn, encompass one or more (e.g., all) reclaim units 514 referenced by the one or more reclaim unit handles 536 identified in the placement handle list 538 (e.g., by RUH IDs 540). In some embodiments, the placement handle list 538 may be created, populated, revised, maintained, and/or the like, by a host, a storage device (e.g., the controller 526), or any other entity or combination thereof. In some embodiments, in addition to namespaces, and/or as an alternative to namespaces, data may he divided and/or arranged into groups based on logical block addresses (LBAs), applications that may use the data, host write traffic threads, and/or the like.

In some embodiments, the use of the placement handles 516 and/or reclaim unit handles 536 may enable the flexible data placement scheme illustrated in FIG. 5 to present a reclaim unit to a host as a logical representation of physical nonvolatile storage within a reclaim group that may be physically erased by the controller 526, for example, without disturbing other reclaim units 514. The controller 526 may implement a logical reclaim unit specified by a host (e.g., using a placement identifier 534) with physical storage media (e.g., one or more erase blocks on an NVM die) that may be selected by the controller 526 and erased as a unit.

In some embodiments, the selection of a reclaim unit 514 and/or reclaim group 518 may be performed, at least partially, by the controller 526. For example, if the controller 526 receives a write command 530 that does not include a placement identifier 534, the controller may use a reclaim unit handle 536 mapped by a default placement handle 516 (e.g., Placement Handle 0) and select a reclaim group 518, thereby selecting the reclaim unit 514 that is within the selected reclaim group 518 and referenced by the reclaim unit handle 536 mapped by the default placement handle 516. As another example, if the controller 526 receives a write command 530 with a placement identifier that includes a placement handle 516 but not a reclaim group identifier 515, the controller 526 may select a reclaim unit 514 by selecting a reclaim group 518 and using the reclaim unit 514 that is within the selected reclaim group 518 and referenced by the reclaim unit handle 536 mapped by the placement handle 516 provided with the write command 530.

In some embodiments, the flexible data placement, scheme illustrated in FIG. 5 may be implemented at least partially using an NVMe protocol. In such an embodiment, placement identifier 534 may be implemented as a portion of the command 530 (e.g., a directive portion of an NVMe command); M, N, and/or P may be parameters that may be configured, for example, using an NVMe Namespace Management command; the controller 526 may be implemented with one or more NVMe controllers; and/or the NVM subsystem 512 may be implemented as an NVMe subsystem, an endurance group (which, in some embodiments may be coextensive with a storage device), an NVMe domain, and/or the like, or any combination thereof. In an embodiment implemented at least partially using an NVMe protocol, a directive specific (DSPEC) field may be used to provide a placement identifier (e.g., a reclaim group (which may be indicated by a reclaim group identifier) and a placement handle). A DSPEC field may be used, for example, in an implementation in which a directive type (DTYPE) field may be used to indicate that a flexible data placement feature is used. In such an embodiment, an invalid and/or default (e.g., all zeros) value of a DSPEC field may indicate the absence of a reclaim group indicator and/or placement handle.

In the embodiments of flexible data placement schemes illustrated in FIG. 2, FIG. 3, FIG. 4, and/or FIG. 5, a reclaim unit may be implemented (at least from the perspective of a host) as a logical representation of an underlying portion of physical storage media. Thus, the host may be shielded from, and/or not aware of, one or more ongoing operations and/or conditions of the storage device that may adversely affect one or more operations involving a physical implementation of a logical reclaim unit selected by the host.

Figure 6:
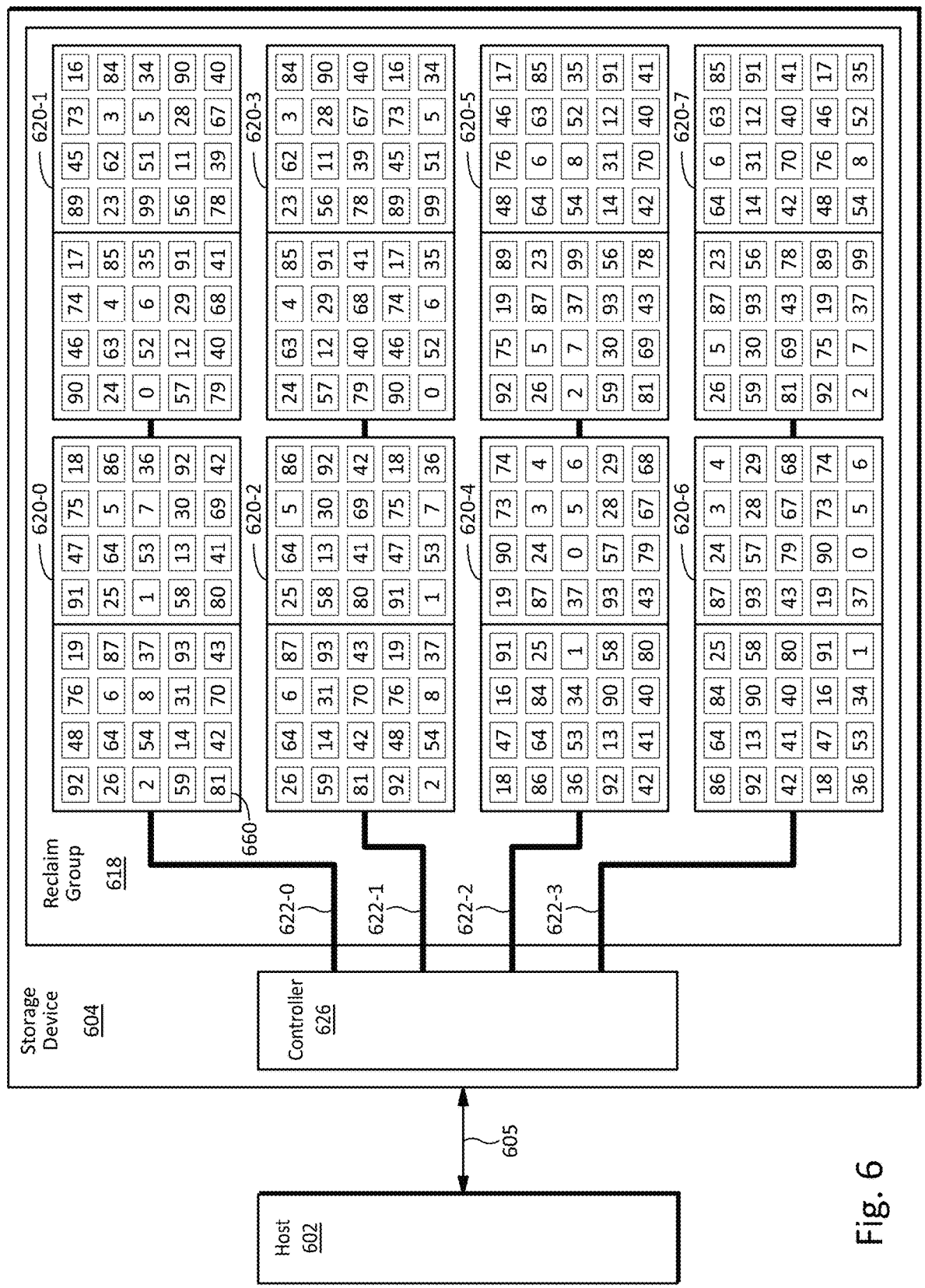
FIG. 6 illustrates another embodiment of a flexible data placement scheme in accordance with example embodiments of the disclosure.

FIG. 6 illustrates another embodiment of a flexible data placement scheme in accordance with example embodiments of the disclosure. In the embodiment illustrated in FIG. 6, a storage device 604 may include storage media implemented with nonvolatile memory devices (e.g., NVM dies) 620 that may be controlled by a controller 626. The storage device 604 may communicate with a host 602 using a communication connection 605.

The embodiment illustrated in FIG. 6 may include eight NVM devices 620 implemented as NVM dies indicated as 620-0, 620-7 which may be referred to collectively and/or individually as 620. Each NVM die may include a first plane shown on the left side of the die and a second plane shown on the right side of the die. Each plane may include 20 erase blocks 660 shown as rectangles with numbers therein. In some embodiments, the number in an erase block 660 may represent a percentage of lifetime P/E cycles that have been performed on the erase block 660. For example, an erase block with the number 30 may have used 30 percent of its lifetime P/E cycles. (For convenience, the individual erase blocks 660 within a plane may be referred to by the numbers inside them.) In some other embodiments, the number in an erase block may represent another aspect of the erase block such as a location on the NVM die, a characterized bit error accumulation rate, a historical temperature exposure, a read and/or write disturbance log (e.g., a log may refer to an accumulated count) and/or the like.

The NVM dies 620 may be arranged in channels 622 with two dies per channel. Thus, NVM dies 620-0 and 620-1 are connected to channel 622-0, NVM dies 620-2 and 620-3 are connected to channel 622-1, NVM dies 620-4 and 620-5 are connected to channel 622-2, and NVM dies 620-6 and 620-7 are connected to channel 622-3. The numbers and/or arrangement of dies, planes, channels, erase blocks, and/or the like illustrated in FIG. 6 are only for purposes of illustrating the inventive principle, and other embodiments may include any numbers and/or arrangements dies, planes, channels, erase blocks, and/or the like. In some embodiments, RUHs may be used to temporarily address one or more RUs 760 while they are receiving write data from the host 702.

Figure 7:
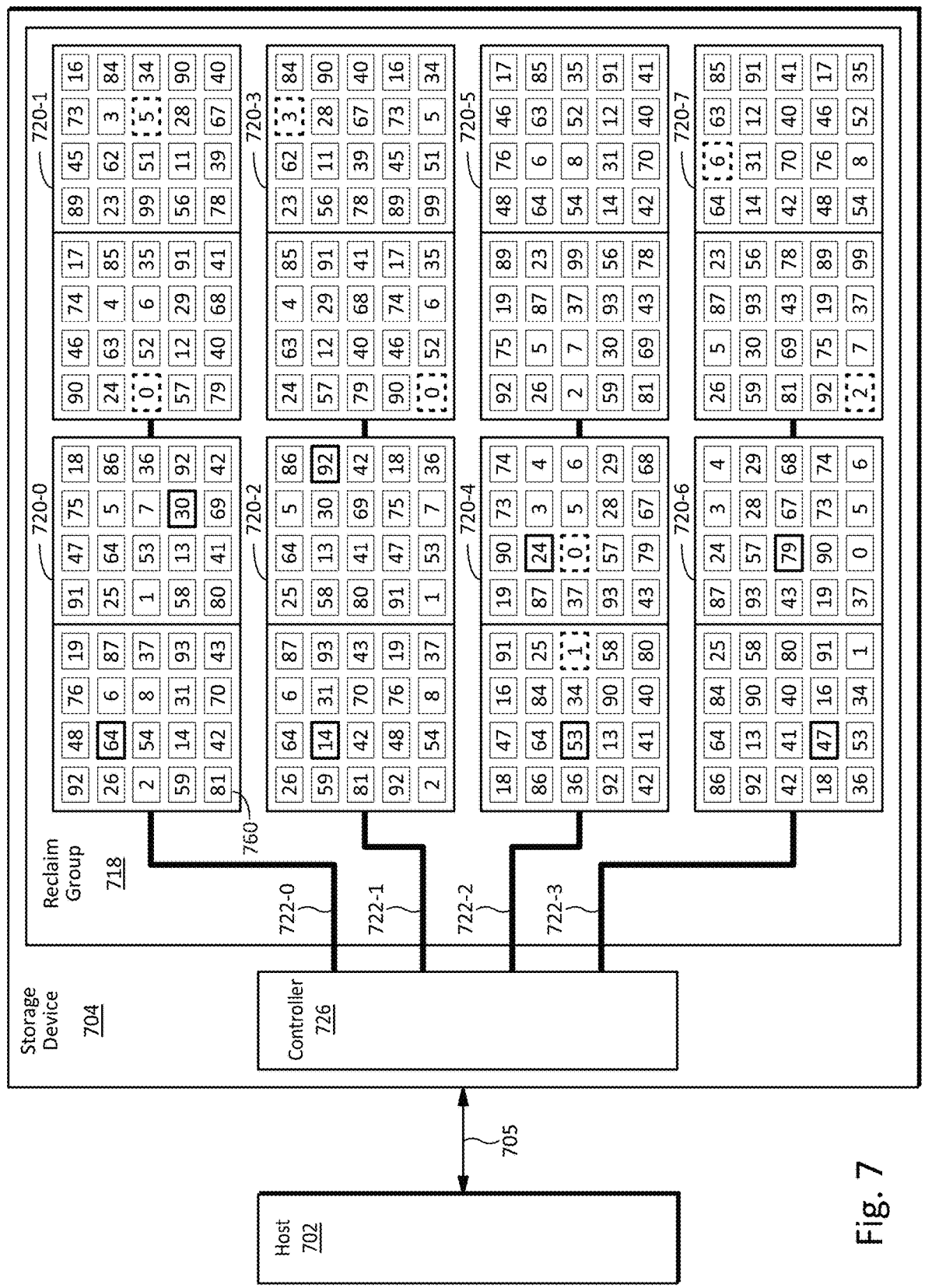
FIG. 7 illustrates a first embodiment of a technique for selecting erase blocks for one or more reclaims for a unit flexible data placement scheme in accordance with example embodiments of the disclosure.

FIG. 7 illustrates a first embodiment of a technique for selecting erase blocks for one or more reclaim units for a flexible data placement scheme in accordance with example embodiments of the disclosure. The technique illustrated in FIG. 7 may be implemented, for example, with the storage device illustrated in FIG. 6, and components that are similar to those illustrated in FIG. 6 may be identified with reference numbers ending in the same digits.

Referring to FIG. 7, the NVM dies 720 may be arranged in a single reclaim group 718. A reclaim unit may be composed by selecting (e.g., by the controller 726) one or more erase blocks 760 based on one or more rules relating to the arrangement of the NVM dies and/or planes 720, channels 722, and/or the like. For example, a reclaim unit may be composed by selecting one erase block 760 from each plane of one NVM die 720 per channel 722.

Within a plane, however, one or more erase blocks may be selected at random. For example, a first reclaim unit (which may be referred to as RU 0) may be composed of erase blocks indicated with heavy solid outlining. Using this technique, RU 0 may include erase block 64 in the left plane of NVM die 720-0, erase block 30 in the right plane of NVM die 720-0 erase block 14 in the left plane of NVM die 720-2, erase block 92 in the right plane of NVM die 720-2, erase block 53 in the left plane of NVM die 720-4, erase block 24 in the right plane of NVM die 720-4, erase block 47 in the left plane of NVM die 720-6, and erase block 79 in the right plane of NVM die 720-6.

(As mentioned above, for convenience, the individual erase blocks 760 within a plane may be referred to by the numbers inside them, which may also represent other characteristics such as percent of P/E cycles used.)

Thus, the erase blocks 760 within reclaim unit RU 0 (heavy solid outlining) may have a wide variety of program cycle counts.

Alternatively, a unit may be composed by selecting one or more erase blocks 760 within each plane that may have the lowest program cycle count. For example, a second reclaim unit (which may be referred to as RU 1) may be composed of erase blocks (indicated with heavy dashed outlining)

having the lowest program cycle count. Using this technique, RU 1 may include erase block 0 in the left plane of NVM die 720-1, erase block 5 in the right plane of NVM die 720-1, erase block 0 in the left plane of NVM die 720-3, erase block 3 in the right plane of NVM die 720-3, erase block 1 in the left plane of NVM die 720-4, erase block 0 in the right plane of NVM die 720-4, erase block 2 in the left plane of NVM die 720-7, and erase block 6 in the right plane of NVM die 720-7.

Thus, the erase blocks 760 within reclaim unit RU 1 (heavy solid outlining) may have relatively low program cycle counts.

Depending on the implementation details, either of these techniques may result in poor performance of a reclaim unit. For example, if the storage device 704 receives a write command with data that may be accessed frequently (e.g., hot data), the controller 726 may store it in reclaim unit RU 0 which was composed using a randomly selected erase blocks, and therefore, may include erase blocks with a variety of program cycle counts including erase blocks with relatively high program cycle counts that may wear out when used to store hot data. As another example, if the storage device 704 receives a write command with data that may not be accessed again for a relatively long time (e.g., cold data), the controller 726 may store it in reclaim unit RU 1 which was composed using erase blocks having the lowest program cycle count which may be wasted on cold data that may tolerate being stored (e.g., more efficiently, at lower cost, and/or the like), in erase blocks having relatively high program cycle counts.

Figure 8:
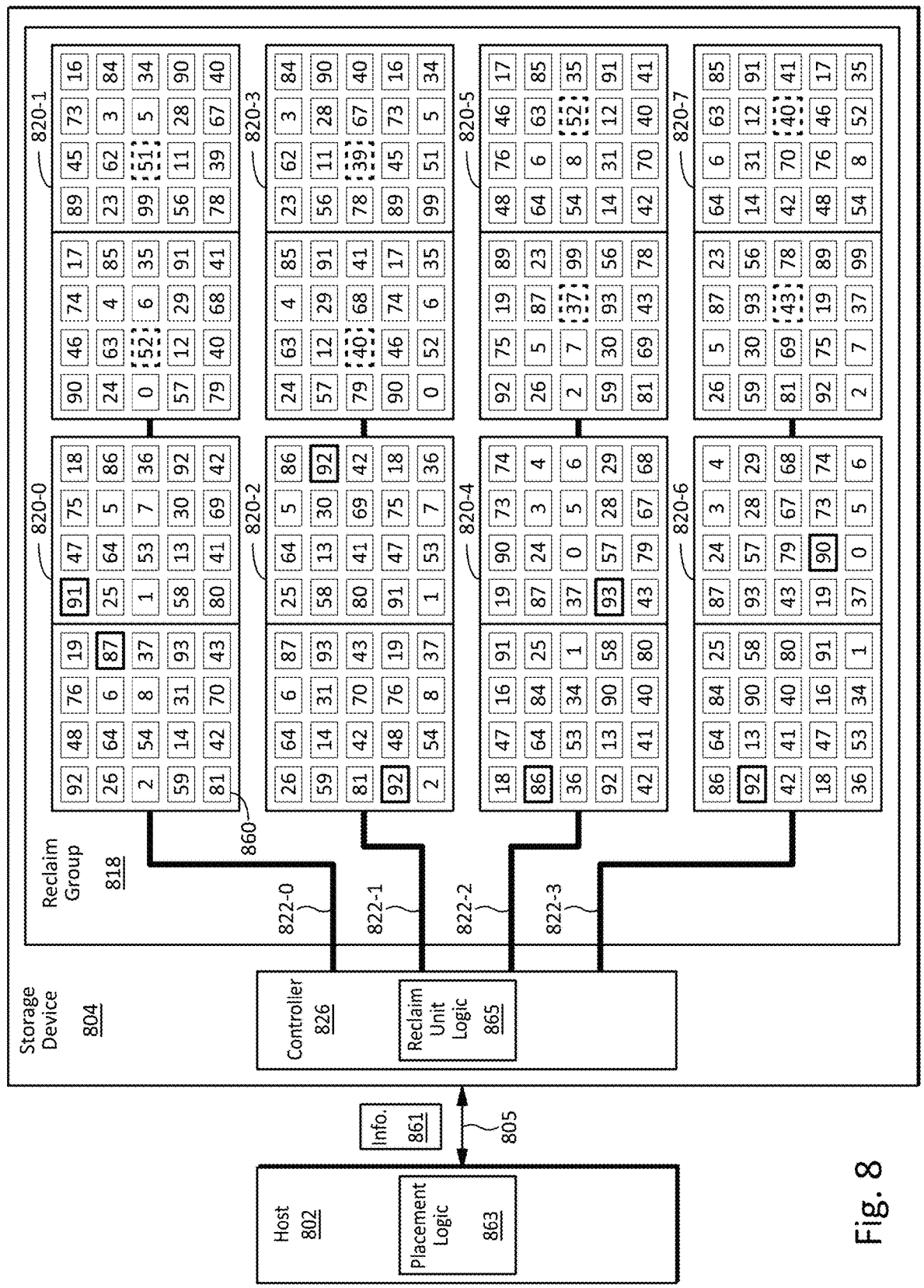
FIG. 8 illustrates a second embodiment of a technique for selecting erase blocks for one or more reclaims for a unit flexible data placement scheme in accordance with example embodiments of the disclosure.

FIG. 8 illustrates a second embodiment of a technique for selecting erase blocks for one or more reclaims for a unit flexible data placement scheme in accordance with example embodiments of the disclosure. The technique illustrated in FIG. 8 may be implemented, for example, with the storage device illustrated in FIG. 6, and components that are similar to those illustrated in FIG. 6 may be identified with reference numbers ending in the same digits.

Referring to FIG. 8, the NVM dies 820 may be arranged in a single reclaim group 818. A reclaim unit may be composed by selecting (e.g., by the controller 826) one or more erase blocks 860 based on one or more rules relating to the arrangement of the NVM dies and/or planes 820, channels 822, and/or the like. For example, a reclaim unit may be composed by selecting one erase block 860 from each plane of one NVM die 820 per channel 822.

Within a plane, however, one or more erase blocks 860 may be selected based on information 861 about data to be stored in the reclaim unit. The information 861 may be received, for example, from host 802 using communication connection 805. The host 802 may include placement logic 863 that may determine (e.g., identify, collect, process, and/or the like) the information 861 to send to the storage device 804. The controller 826 may include reclaim unit logic 865 that may use the information 861 to select a reclaim unit and/or erase blocks 860 to include within a reclaim unit.

For example, the information 861 may indicate that data to be stored in a first reclaim unit (which may be referred to as RU 2) may be relatively cold data that is not expected to be accessed frequently. Thus, the reclaim unit logic 865 may compose RU 2 using erase blocks 860 having relatively high P/E cycle counts as indicated with heavy solid outlining. Using this technique, RU 2 may include erase block 87 in the left plane of NVM die 820-0, erase block 91 in the right plane of NVM die 820-0, erase block 92 in the left plane of NVM die 820-2, erase block 92 in the right plane of NVM die 820-2, erase block 86 in the left plane of NVM die 820-4, erase block 93 in the right plane of NVM die 820-4, erase block 92 in the left plane of NVM die 820-6, and erase block 90 in the right plane of NVM die 820-6.

The controller 826 and/or reclaim unit logic 865 use the composed reclaim unit RU 2 to store data received for a current write command (e.g., the controller 826 may use a reclaim unit handle provided by a current write command to reference RU 2), or the composed reclaim unit RU 2 may be saved for use with a future write command, reclaim unit handle, and/or the like.

Depending on the implementation details, a reclaim unit RU 2 composed as described above may be used to efficiently store data indicated by a host as being relatively cold data, thereby saving other erase blocks with relatively low P/E cycle counts for relatively hot data.

Alternatively, or additionally, the information 861 may indicate that data to be stored in a second reclaim unit (which may be referred to as RU 3) may be relatively sensitive to stresses resulting from being located near the periphery of an NVM die 820. Thus, the reclaim unit logic 865 may compose RU 3 using erase blocks 860 located near the center of an NVM die 820 shown with heavy dashed outlining. Using this technique, RU 3 may include erase block 52 in the left plane of NVM die 820-1, erase block 51 in the right plane of NVM die 820-1, erase block 40 in the left plane of NVM die 820-3, erase block 39 in the right plane of NVM die 820-3, erase block 37 in the left plane of NVM die 820-5, erase block 52 in the right plane of NVM die 820-5, erase block 43 in the left plane of NVM die 820-7, and erase block 40 in the right plane of NVM die 820-7.

The controller 826 and/or reclaim unit logic 865 use the composed reclaim unit RU 3 to store data received for a current write command (e.g., the controller 826 may use a reclaim unit handle provided by a current write command to reference RU 3), or the composed reclaim unit RU 3 may be saved for use with a future write command, reclaim unit handle, and/or the like.

Depending on the implementation details, a reclaim unit RU 3 composed as described above may be used to efficiently store data indicated as being relatively sensitive to stresses resulting from being located near the periphery of an NVM die 820, while using other erase blocks 860 located near the periphery of an NVM die 820 to compose other erase units to store data that may be less sensitive to being located near the periphery of an NVM die 820.

Although the embodiments illustrated in FIG. 7 and FIG. 8 are implemented with a single reclaim group that may include all eight NVM dies, in other embodiments the NVM dies may be arranged in any other configuration of reclaim groups. For example, in some embodiments, each NVM die may be configured as a separate reclaim group. In such an embodiment, a reclaim unit may be composed, for example, by selecting one erase block from each plane of the NVM Within a plane, one or more erase blocks may be selected based on information (e.g., received from a host) about data to be stored in the reclaim unit. In such an embodiment with multiple reclaim groups, a reclaim group may be selected based on (e.g., to best align with) the information about data to be stored in the reclaim unit. Moreover, in an NVMe implementation with flexible data placement, if a write command does not specify a reclaim group, the controller 826 may select a reclaim group, for example, based on the information 861.

Figure 9:
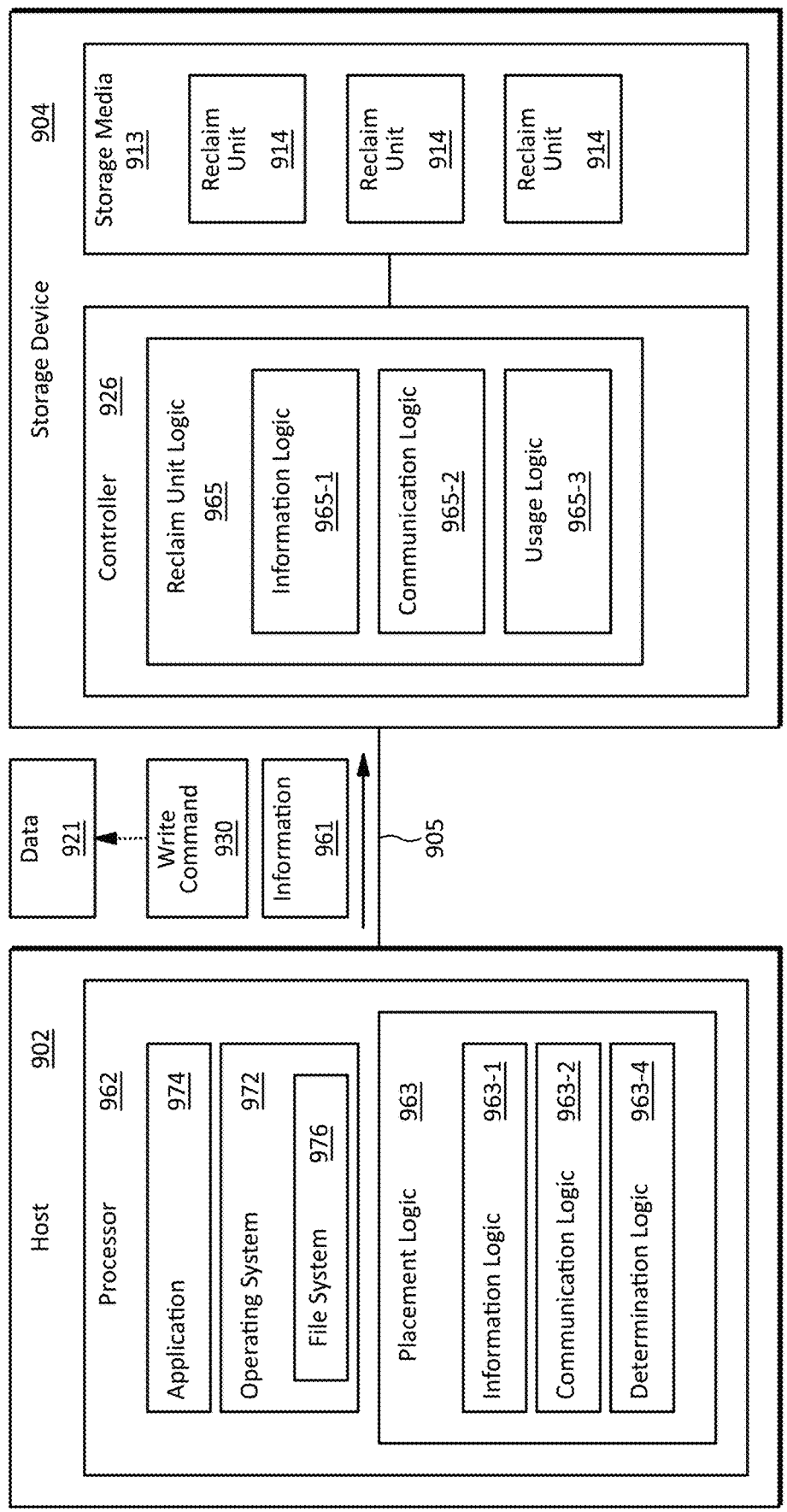
FIG. 9 illustrates an embodiment of a storage system implementing a flexible data placement scheme in accordance with example embodiments of the disclosure.

FIG. 9 illustrates an embodiment of a storage system implementing a flexible data placement scheme in accordance with example embodiments of the disclosure. The embodiment illustrated in FIG. 9 may include a host 902 and a storage device 904 communicating using a communication connection 905. The storage device 904 may include a controller 926 (which may control the overall operation of the storage device 904) and storage media 913 including one or more reclaim units 914 that may be selected, composed, and/or the like as described herein.

The controller 926 may include reclaim unit logic 965 that may implement any of the flexible data placement schemes disclosed herein that may select and/or compose one or more reclaim units 914 based on information 961 about data 921 to store in the one or more reclaim units 914. The information 961 may be provided, for example, by the host 902. The data 921 may be specified, for example, by a write command 930 sent from the host 902 to the storage device 904, The write command 930 may specify the data 921, for example, by including the data 921 with and/or within the write command 930, by sending an pointer, address, and/or other indication of a location of the data in (e.g., in memory, in storage, on a network, and/or the like), and/or in any other manner.

The host 902 may include one or more processors 962 that may implement placement logic 963 that provide any of the information 961 about data to store in the one or more reclaim units 914 of storage device 904. The one or more processors 962 may also execute one or more operating systems 972 which in turn may execute applications 974, file systems 976, and/or the like. Any of the operating systems 972, applications 974, file systems 976, and/or the like, may be users of data that may be stored in the one or more reclaim units 914 of storage device 904. In some embodiments, the placement logic 963 may be implemented partially or entirely separate from the one or more processors 962, for example, using dedicated hardware such as a complex programmable logic device (CPLD), field programmable gate array (FPGA), application specific circuit (ASIC), and/or the like. For example, in some embodiments, the placement logic 963 may be implemented at least partially with hardware that may perform a lookup using one or more keys to obtain one or more values.

The placement logic 963 in the host 902 and the reclaim unit logic 965 in the storage device 904 may include information logic 963-1 and 965-1, respectively, that may implement host-side functionality and device-side functionality, respectively, relating to the type of information 961 that may be provided to, and/or used by, the storage device 904 to select and/or compose on or more reclaim units 914 for storing data based, for example, on write requests (e.g., write commands) received from the host 902.

In some embodiments, the information logic 963-1 and/or 965-1 may enable the host 902 to provide, and/or the storage device 904 to use, access information about data to be stored in a reclaim unit. Access information may include access information, for example, historical access information such as how recently and/or frequently the data has been written, read, re-written, and/or the like. For example, if data has been written and then not read or re-written in a relatively long time, the data may be considered relatively cold data. Historical access information may be sent from the host 902 to the storage device 904 which may use the historical access information to determine whether the data 921 to store in the one or more reclaim units 914 may be considered hot, cold, and/or the like. Thus, the device-side information logic 965-1 may make a prediction of future access of the data 921 based on historical access information.

Additionally, or alternatively, access information sent from the host 902. to the storage device 904 may include a determination made by the host-side information logic 963-1. For example, the host 902 may store a set of data in the storage device 902 using a first set of LBAs. The host 902 may read a portion of the set of data from the storage device 904, for example, as part of a file system compaction operation (e.g., a garbage collection operation to remove one or more gaps between remaining valid portions of the set of data), and write the portion of the set of data to the storage device 904 using a second set of LBAs. The host-side information logic 963-1 may send information 961 to the device-side information logic 965-1 indicating that the data 921 may be relatively cold data (e.g., the data 921 was not re-written recently and, therefore, was compacted as part of a garbage collection operation). Thus, the host-side information logic 963-1 may make a prediction of future access of the data 921 based on historical access information.

In addition to predictions based on historical access information, information logic 963-1 and/or 965-1 may enable the host 902 to provide, and/or the storage device 904 to use, predictions based on any other basis. For example, a host may recognize a new thread started by an application 974 as being relatively active, important, and/or the like, and assume any data associated with the application may be hot data. Thus, the host-side information logic 963-1 may make a prediction of future access of the data 921 based on one or more characteristics of a thread, an application 974, and/or the like, and send information 961 to the device-side information logic 965-1 indicating that any write data 921 associated with the thread, application, and/or the like may be considered relatively hot data.

Additionally, or alternatively, access information may include information such as how soon the data is expected (e.g., predicted) to be overwritten, read, and/or the like. For example, even if some data has not been accessed recently, there may be one or more indicators of an upcoming event, recent accesses of related data, and/or the like, that may indicate the data may be accessed soon, and thus, it may be considered relatively hot data.

Additionally, or alternatively, the information logic 963-1 and/or 965-1 may enable the host 902 to provide, and/or the storage device 904 to use, information about one or more acceptable characteristics of storage media that may be used to store the data 921 that the information 961 is provided for. Acceptable characteristics may include error tolerance information such as an acceptable bit error rate (BER), which in turn may be based on a bit error accumulation. For example, a BER and/or a bit error accumulation may be specified based on a length of time the data is stored, a number of read operations performed on the data, a number of re-write operations (e.g., refresh operations) performed on the data, one or more data movement operations, (e.g., garbage collection (GC) operations) performed on the data, and/or the like. As another example, a BER and/or a bit error accumulation may be correlated to a number of remaining PE/E cycles in the expected and/or estimated lifetime of a reclaim unit and/or erase blocks used in the reclaim unit. As with information about accesses as discussed above, information about acceptable characteristics of storage media may be based on historical information, predictions based on historical information, predictions based on any other bases, and/or the like.

Additionally, or alternatively, the information logic 963-1 and/or 965-1 may enable the host 902 to provide, and/or the storage device 904 to use, information about one or more attributes of data 921 to store in the device. For example, attribute information may include quality-of-service (QoS) information that may specify a required availability for the data to be stored in the reclaim unit. As another example, the attribute information may include access latency information for the data to be stored in the reclaim unit. This may be affected, for example, by the wear level of the storage media (e.g., the age of a NVM cell may affect the read time, write (program) time, erase time, and/or the like). As a further example, the attribute information may include access bandwidth information which may also be affected, for example, by the wear level of the storage media. As an additional example, attribute information may include service level agreement (SLA) information which may specify, for example, a required minimum number of P/E cycles remaining for storage media in which the data is to be stored regardless of whether the data is actually likely to be accessed frequently (e.g., even if the data to be stored is relatively cold data). As with information about accesses as discussed above, information about one or more attributes of data 921 may be based on historical information, predictions based on historical information, predictions based on any other bases, and/or the like.

Additionally, or alternatively, the information logic 963-1 and/or 965-1 may enable the host 902 to provide, and/or the storage device 904 to use, information about a type and/or usage of data 921 to be stored in the reclaim unit. For example, data such as operating system metadata, file system tables, and/or the like may be accessed frequently, and therefore, a reclaim unit in which such data may be stored may be selected and/or composed to include one or more erase blocks that may have a relatively large number of P/E cycles remaining. As with information about accesses as discussed above, information about a type and/or usage of data 921 may be based on historical information, predictions based on historical information, predictions based on any other bases, and/or the like.

In some embodiments, the placement logic 963 in the host 902 and the reclaim unit logic 965 in the storage device 904 may include communication logic 963-2 and 965-2, respectively, that may implement host-side functionality and device-side functionality, respectively, relating to the manner in which the information 961 may be communicated from the host 902 to the storage device 904.

The communication logic 963-2 and/or 965-2 may enable the host 902 to receive, and/or the storage device 904 to send, the information 961 implicitly and/or explicitly. For example, the information 961 may be conveyed implicitly by defining one or more reclaim unit handle identifiers (e.g., reclaim unit numbers) that may be recognized and/or expected to correspond to different access information for data to store in a corresponding reclaim unit. For example, a reclaim unit handle RUH 0 may be recognized as implicitly indicating that the data to be stored using this reclaim unit handle is relatively hot data, and a reclaim unit handle RUH 1 may be recognized as implicitly indicating that the data to be stored using this reclaim unit handle is relatively cold data. Moreover, a range of reclaim unit handle identifiers (e.g., a range of numbers) may be used to indicate a range of access information (e.g., a range of access frequency in which one end of the range indicates the most frequently accessed data, and the other end indicates the least frequently accessed data. As a further example, a reclaim unit handle RUH 3 may be recognized as implicitly indicating that the data to be stored using this reclaim unit handle may be stored in a reclaim unit having relatively lower performance characteristics (e.g., a relatively higher P/E cycle count).

Additionally, or alternatively, the communication logic 963-2 and/or 965-2 may enable the host 902 to receive, and/or the storage device 904 to send, the information 961 explicitly, for example, using one or more fields, extensions, and/or the like, of a command, handle, and/or the like that may provide explicit information about the data. For example, a host may send a reclaim unit handle that includes an extension. One type of extension may indicate that the data to be stored using the reclaim unit handle may be relatively hot, and another type of extension may indicate that the data to be stored using the reclaim unit handle may be relatively hot. One or more additional extensions may indicate that the data is somewhere in between hot and cold. Depending on the implementation details, such an implementation may use one or more reclaim unit resources that may be sized based on each variety of indication times the number of reclaim unit handles used.

Additionally, or alternatively, the communication logic 963-2 and/or 965-2 may enable the host 902 to receive, and/or the storage device 904 to send, the information 961 in a persistent manner (e.g., information for data for a sequence of write commands and/or reclaim unit handles may be the same until the information is updated). For example, a host may send an indication that may act as a setting to indicate that a reclaim unit for one or more subsequent write commands may be treated has having a specific type of information about the data, for example, until the setting is changed, until a specific time has passed, until a specific number of commands have been processed with the setting, a specific number of reclaim units have been filled for a reclaim unit handle, and/or the like.

Additionally, or alternatively, the communication logic 963-2 and/or 965-2 may enable the host 902 to receive, and/or the storage device 904 to send, the information 961 on an individual basis. For example, information about data to store in one or more reclaim units may be provided for each write command, each reclaim unit handle update, and/or the like.

Additionally, or alternatively, the communication logic 963-2 and/or 965-2 may enable the host 902 to receive, and/or the storage device 904 to send, the information 961 using any other communication technique such as: a setting of a storage device controller; a namespace attribute; with a request for an update operation for a reclaim unit handle; as a configuration setting for a flexible data placement scheme; in a field of an input and/or output (I/O or IO) command; in a field of a management command; as an attribute, setting, and/or the like of a nonvolatile memory (NVM) subsystem, controller, namespace, and/or the like. For example, some or all of the information 961 may be provided with a write command such as write command 330 illustrated in FIG. 3. As a further example, some or all of the information 961 may be provided with an update request such as the update request 423 illustrated in FIG. 4. As a further example, some or all of the information 961 may be provided with a namespace management operation such as to establish, configure, and/or update the namespace 525 illustrated in FIG. 5. As a further example, some or all of the information 961 may be provided with a NVM subsystem management operation such as to establish, configure, and/or update the NVM subsystems 106 and/or 206 illustrated in FIG. 1 and/or FIG. 2, respectively. As a further example, in an implementation that uses NVMe, the information 961 may be communicated using a Dataset Management (DSM) command (e.g., using a context attribute), using one or more bits in a directive specific field (e.g., DSPEC field), and/or using a directive type field (DTYPE field) communicated with a command in a submission queue entry (SQE). As yet another example, the information 961 may be communicated using a vendor specific technique.

In some embodiments, the reclaim unit logic 965 in the storage device 904 may include usage logic 965-3 that may implement device-side functionality relating to the manner in which the information 961 may be used to compose and/or select one or more reclaim units 914. For example, if the information 961 indicates that the data is likely to be written, read, re-read and/or re-written frequently is hot data), the usage logic 965-3 may enable the storage device 904 to select and/or compose a reclaim unit with storage media that may have a relatively large number of P/E cycles remaining in its expected lifetime. Additionally, if the information 961 indicates that the data is not likely to be written, read, re-read, and/or re-written soon or frequently (e.g., is cold data), the usage logic 965-3 may enable the storage device 904 to select and/or compose a reclaim unit with storage media that may have a relatively small number of P/E cycles remaining in its expected lifetime.

As another example, if the information 961 indicates that the data has a relatively high tolerance for errors, for example, because the data may be stored in the storage device as part of a redundant storage scheme, the storage device may select and/or compose a reclaim unit with storage media that may have a relatively small number of P/E cycles remaining in its expected lifetime (e.g., storage media that may have a relatively high level of wear). For example, if the data is stored in a redundant array of independent drives (RAID) and/or a redundancy scheme having a relatively large number of mirrors (e.g., three mirrors instead of two mirrors), this may indicate that a host may provide a relatively high rate of data protection (e.g., a relatively high rate of data loss may be acceptable), and the data may be stored using storage media that may have a relatively small number of effectively estimated P/E cycles remaining in its expected lifetime. As another example, if the host does not let, the data rest in storage very long (e.g., for a minimal amount of BER accumulation), the data may be stored using storage media that may have a relatively large number of effectively estimated P/E cycles remaining in its expected lifetime.

As another example, the usage logic 965-3 may identify and/or use one or more attributes of one or more portions of the storage media 913 to compose and/or select one or more reclaim units 914 based on an attribute's correlation to an improved ability to tolerate a relatively large number of P/E cycles and/or accumulate a relatively smaller number of bit errors. For example, one or more erase blocks may be selected for a reclaim unit, and/or a reclaim unit may be selected based on it including storage media with one or more attributes such as wafer production attributes (e.g., location of a die on a wafer), erase block location on a storage medium die, voltage and/or speed characteristics of read, write (program), and/or erase operations, bit error rate accumulation of the storage media, current and/or historical temperature exposure of the storage media, access activity (e.g., read, write (program), and/or erase operations) of the storage media and/or neighboring media, and/or the like.

In some embodiments, the manner in which the information 961 may be used to compose and/or select one or more reclaim units 914 may be based on one or more differentiating methods such as binary thresholds, binning, analog thresholds, and/or the like. For example, with a binary threshold, an erase block may be considered to have a high BER if the BER is above a threshold and a low BER if the BER is below the threshold. However, with a binning technique, erase blocks may be divided into multiple bins based on two or more thresholds (e.g., behavior expectations). For example, four different thresholds may be used to separate erase blocks into five different bins, each of which may be used to compose reclaim units for data having different levels of tolerance for bit errors. As a further example, data that has been garbage collected once may be indicated as belonging to a first bin for data that is cold, whereas data that has been garbage collected twice may be indicated as belonging to a second bin for data that is even colder.

In some embodiments with an analog or proportional differentiating scheme, erase blocks may be characterized as having a specific value of a characteristic, attribute, and/or the like. For example, a floating point number or digital number that may use relatively high quantization digital mathematics may be used to characterize the speed and/or voltage of a program, read, and/or erase operation for an erase block, and the floating point number or digital number may be used to select the erase block for a reclaim unit 914 based on the information 961 provided to the storage device 904.

In some embodiments, the placement logic 963 at the host 902 may include determination logic 963-4 that may implement host-side functionality relating to the manner in which the host 902 may determine the information 961 to send to the storage device 904. The determination logic 963-4 may enable the host 902 to identify, collect, process, and/or the like, the information 961 to send to a storage device. For example, a host may observe that data written by a user (e.g., an operating system 972, an application 974, a file system 976, and/or the like) may be, or is likely to be, in continuous use and/or has been stored, is likely to be stored, for a relatively long time and may send this information to a storage device, for example, along with a write request. Additionally, or alternatively, the determination logic 963-4 may translate this type of information to another type of information that may be more directly acted upon by the storage device 904. For example, if the determination logic 963-4 determines that data written by a user has been stored, or is likely to be stored, for a relatively long time, the determination logic 963-4 may send information 961 indicating that the data is relatively cold data.

As another example, the determination logic 963-4 may observe that data written by a user may be, or is likely to be, compacted (e.g., garbage collected) at a file system level, a database level and/or the like, and send this information to a storage device along with a write request for the data. For example, the determination logic 963-4 may characterize user data that may be, or is likely to be, compacted as relatively hot data. As a further example, a host may determine a number of times data has been compacted (e.g., garbage collected) and send this information to a storage device along with the data to be stored at the device. Depending on the implementation details, multiple compaction operations on the same data may increase the correlation between the data and the likelihood that the data will be accessed frequently.

As an additional example, the determination logic 963-4 may characterize data usage based on one or more data management schemes such as one or more cache replacement policies, hierarchical storage schemes, multitier storage architectures, and/or the like, and send this information to a storage device along with the data to be stored at the device. For example, with data stored as part of a cache replacement policy, a cache level at which the data is stored may indicate a relative likelihood that the data will be accessed frequently (e.g., data stored at an L1 cache level may be accessed more frequently than data stored at an L3 cache level). Similarly, data stored at a higher level of a hierarchical storage scheme may be accessed more frequently than data stored at a lower level of the hierarchical storage scheme. Thus, the determination logic 963-4 may report such usage information to the storage device 904 directly as information 961 and/or translate such usage to information 961 indicating that the data is relatively hot or cold.

In some embodiments, the reclaim unit logic 965 may compose and/or select one or more reclaim units 914 based on a combination of information 961 received from outside the storage device 904 and information obtained locally at the storage device 904 (which may be referred to as local information and/or locally derived information). For example, the reclaim unit logic 965 may collect one or more statistics on data stored at the storage device 904. Examples of statistics may include write count and/or frequency, re-write count and/or frequency, read count and/or frequency, and/or the like. In some embodiments, such statistics may be threshold and/or range mapped to different reclaim groups, reclaim units, and/or the like in storage media 913. Such statistics may be combined with received information 961 to compose and/or select one or more reclaim units 914 (e.g., reclaim unit handle to reclaim unit classification and/or mapping). For example, a host 902 may provide a mirror and/or non-mirror bit error classification in the information 961. The reclaim unit logic 965 may combine this classification with one or more locally derived statistics to compose and/or select one or more reclaim units 914 to use for a data operation request a write command 930).

Figure 10:
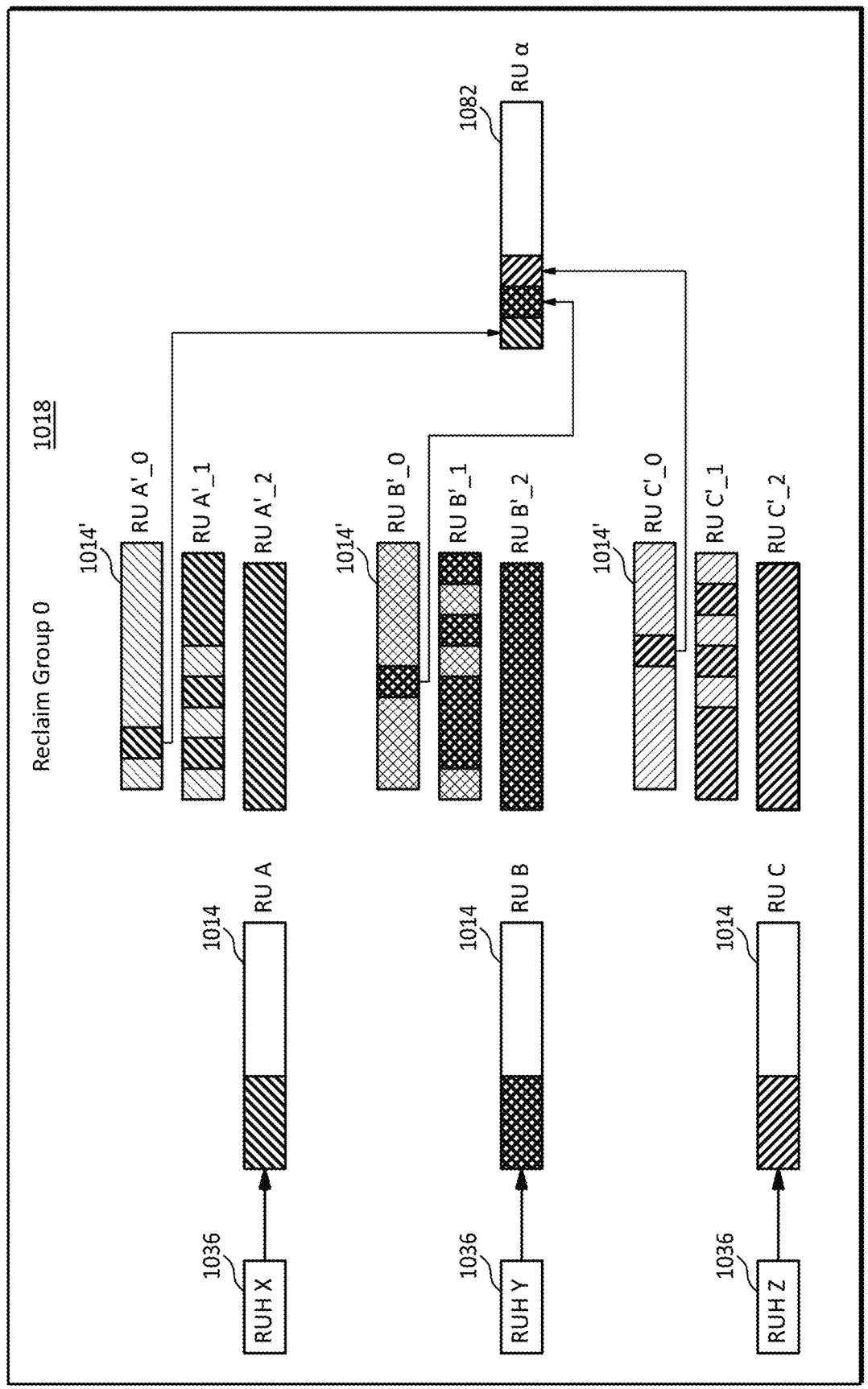
FIG. 10 illustrates an embodiment of an initial isolation scheme for a flexible data. placement scheme for a storage device in accordance with example embodiments of the disclosure.

FIG. 10 illustrates an embodiment of an initial isolation scheme for a flexible data placement scheme for a storage device in accordance with example embodiments of the disclosure. The embodiment illustrated in FIG. 10 may include three reclaim unit handles 1036 identified as RUH X, RUH Y, and RUH Z.

The reclaim unit handle RUH X may currently reference a reclaim unit 1014 identified as RU A. The reclaim unit RU A may be partially filled with data as shown with single diagonal shading with lines running from top right to bottom left. The reclaim unit handle RUH X may have previously referenced reclaim units 1014' identified as RU A'_0, RU A'_1, and RU A'_2. The previously referenced reclaim units 1014' may have been filled with data (as shown with single diagonal shading with lines running from top right to bottom left), for example, when they were referenced by RUH X in a manner similar to the way the reclaim unit 314 identified as RU 4 was filled with data when it was referenced by Reclaim Unit Handle 1 (RUH 1) as illustrated in FIG. 3B and FIG. 3C. Although not currently referenced by RUH X, the previously referenced reclaim units RU A'_0, RU A'_1, and RU A'_2 may still remain associated with RUH X, for example, by using a data structure such as a reclaim unit association table.

The reclaim unit handle RUH Y may currently reference a reclaim unit 1014 identified as RU B. The reclaim unit RU B may be partially filled with data as shown with diagonal cross shading. The reclaim unit handle RUH Y may have previously referenced reclaim units 1014' identified as RU B'_0, RU B'_1, and RU B'_2. The previously referenced reclaim units 1014' may have been filled with data (as shown with diagonal cross shading), for example, when they were referenced by RUH Y.

Likewise, the reclaim unit handle RUH Z may currently reference a reclaim unit 1014 identified as RU C. The reclaim unit RU C may be partially filled with data as shown with single diagonal shading with lines running from top left to bottom right. The reclaim unit handle RUH Z may have previously referenced reclaim units 1014' identified as RU C'_0, RU C'_1, and RU C'_2. The previously referenced reclaim units 1014' may have been filled with data (as shown with single diagonal shading with lines running from top left to bottom right), for example, when they were referenced by RUH Z.

In some embodiments, a controller within a storage device may perform one or more operations (e.g., maintenance operations) on data stored in previously referenced reclaim units 1014'. For example, some or all of the data stored in the previously referenced reclaim units 1014' may be deallocated (e.g., by a host), thereby resulting in unused storage capacity in the previously referenced reclaim units 1014'. This is illustrated in FIG. 10 in which the portions of the previously referenced reclaim units 1014' containing deallocated (e.g., invalid) data are shown with shading having relatively thinner lines.

In some embodiments, a controller may perform one or more maintenance operations to enable the unused storage capacity in the previously referenced reclaim units 1014' to be erased, reused, repurposed, and/or the like. For example, a controller may perform a garbage collection operation in which valid data (e.g., data that has not been deallocated) in one or more of the previously referenced reclaim units 1014' may be copied to a different reclaim unit so the one or more of the previously referenced reclaim units 1014' may be erased and reused.

The embodiment illustrated in FIG. 10 may implement an initial isolation scheme in which data written to reclaim units that are currently, or were previously, referenced by different reclaim unit handles 1036 may be initially isolated from each other, (In some embodiments, data. may be considered isolated if the reclaim unit in which it is stored only includes data that was written to the reclaim unit using the same reclaim unit handle.) Thus, reclaim units RU A, RU A'_10, RU A'_1, and RU A'_2 may only include data that was written when these reclaim units were referenced by RUH X. Similarly, reclaim units RU B, RU B'_0, RU B'_1, and RU B'_2 may only include data that was written when these reclaim units were referenced by RUH Y, and reclaim units RU C, RU C'_0, RU C'_1, and RU C'_2 may only include data that was written when these reclaim units were referenced by RUH Z.

However, as part of a controller operation, data from reclaim units that were written using different reclaim unit handles may be combined in a single reclaim unit. This is illustrated in FIG. 10 in which a controller may read valid data from previously referenced reclaim units RU A'_0, RU B'_0, and RU C'_0 and write them to a reclaim unit 1082 identified as RU α. Because the valid data copied from the previously referenced reclaim units RU A'_0, RU B'_0, and RU C'_0 may be the last remaining valid data in one or more of these reclaim units, one or more of the reclaim units RU A'_0, RU B'_0, and/or RU C'_0 may be erased, e.g., as part of a garbage collection operation to be reused for storing other data. A reclaim unit that has been erased (e.g., garbage collected) may be removed from a reclaim unit association table that it may have been listed in.

In some embodiments, the isolation scheme illustrated in FIG. 10 may be referred to as an initial isolation scheme because data written using different reclaim unit handles 1036 may be initially isolated in different reclaim units, but may eventually be combined, for example, by a subsequent operation such as a garbage collection operation, a media management operation (e.g., refresh program, read disturb), and/or the like. In some embodiments, the isolation scheme illustrated in FIG. 10 may be referred to as a host isolation scheme because the host may determine (e.g., using reclaim unit handles) the placement of data in isolated reclaim units.

TABLE 1

Reclaim Unit Association Table

| Reclaim Unit Handle X | Reclaim Unit Handle Y | Reclaim Unit Handle Z |
|---|---|---|
| RU A'_0 | RU B'_0 | RU C'_0 |
| RU A'_1 | RU B'_1 | RU C'_1 |
| RU A'_2 | RU B'_2 | RU C'_2 |
| ... | ... | ... |

Although one reclaim group 1018 is illustrated in FIG. 10, the reclaim units 1014 may be arranged in any number of reclaim groups. In some embodiments, data from reclaim units in different reclaim groups (e.g., valid data from previously referenced reclaim units in different reclaim groups) may be combined in the same reclaim unit.

Figure 11:
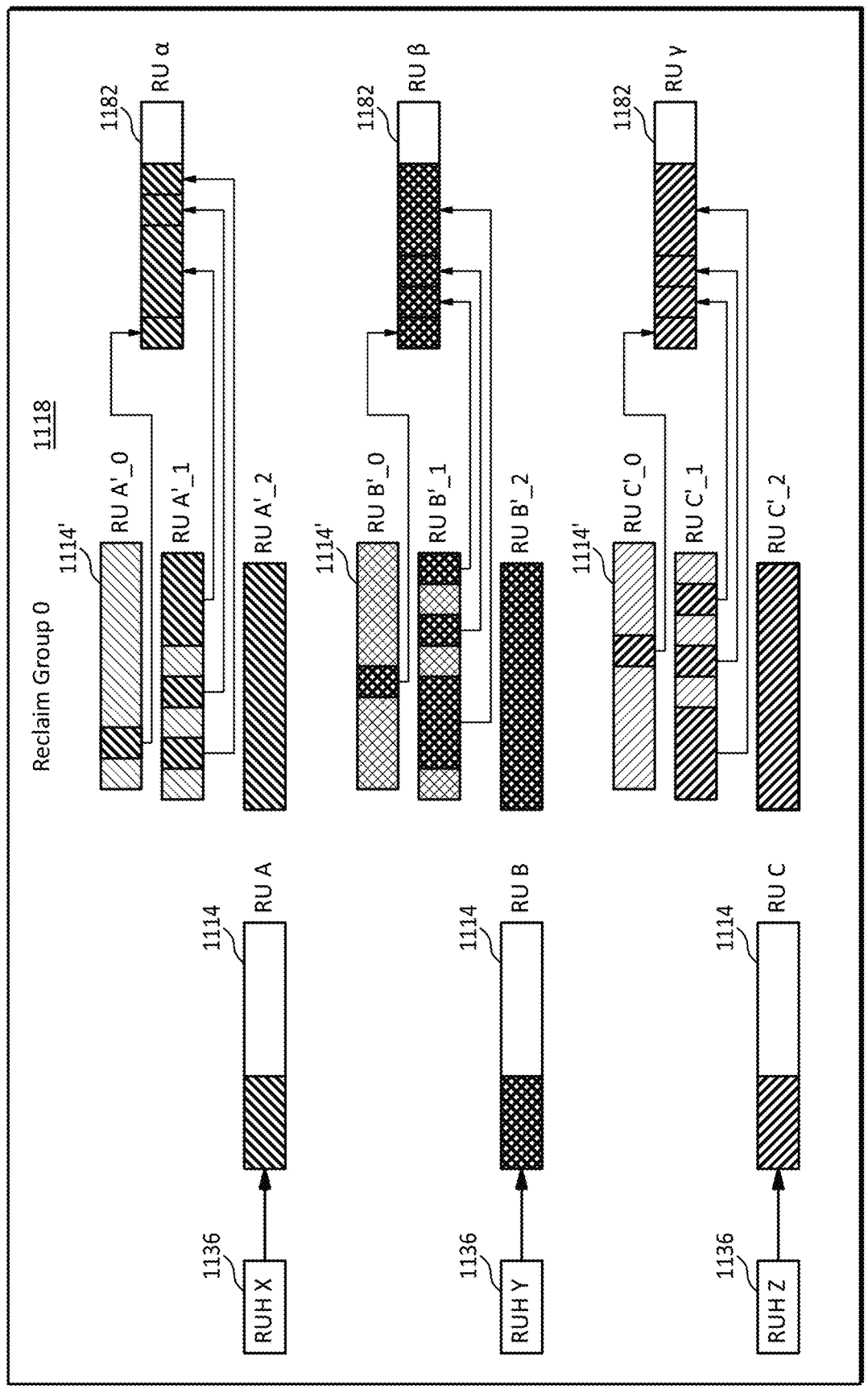
FIG. 11 illustrates an embodiment of a persistent isolation scheme for a flexible data placement scheme for a storage device in accordance with example embodiments of the disclosure.

FIG. 11 illustrates an embodiment of a persistent isolation scheme for a flexible data placement scheme for a storage device in accordance with example embodiments of the disclosure. The embodiment illustrated in FIG. 11 may include three reclaim unit handles 1136 identified as RUH X, RUH Y, and RUH Z that may be used to write data to currently referenced reclaim units 1114 and/or previously referenced reclaim units 1114' in a manner similar to that described above with respect to FIG. 10.

However, the isolation scheme illustrated in FIG. 11 may involve more isolation of data that was written using different reclaim unit handles compared to the embodiment described above with respect to FIG. 10. For example, in the embodiment illustrated in FIG. 11, in a controller operation that may move data frons previously referenced reclaim units 1114', data that was written using different reclaim unit handles may not be combined in a single reclaim unit. This is illustrated in FIG. 11 in which a controller may read valid data from (e.g., only from) previously referenced reclaim units RU A'_0, RU A'_1, and/or RU A'_2 which were written using the same reclaim unit handle RUH X and write it to a reclaim unit 1182 identified as RU α. However, in some embodiments, reclaim unit RU α may not receive data from reclaim units that were written using other reclaim handles such as RUH Y and/or RUH Z.

Similarly, a controller may read valid data from (e.g., only from) previously referenced reclaim units RU B'_0, RU B'_1, and/or RU B'_2 which were written using the same reclaim unit handle RUH Y and write it to a reclaim unit 1182 identified as RU β. A controller may also read valid data from (e.g., only from) previously referenced reclaim units RU C'_0, RU C'_1, and/or RU C'_2 which were written using the same reclaim unit handle RUH Z and write it to a reclaim unit 1182 identified as RU γ. Thus, in some embodiments, data written to one or more of the reclaim units 1182 may be read from (e.g., only read from) one or more reclaim units that were written using the same reclaim unit handle.

If the valid data read from any of the previously referenced reclaim units 1114' was the last remaining valid data in the reclaim unit, the reclaim unit may be erased, e.g., as part of a garbage collection operation to be reused for storing other data.

In some embodiments, the isolation scheme illustrated in FIG. 11 may be referred to as a persistent isolation scheme because the isolation between data written using different reclaim unit handles may continue beyond the writing and/or deallocating operations, for example, to include one or more garbage collection and/or other controller operations. In some embodiments, the isolation scheme illustrated in FIG. 11 may be referred to as a fully or totally isolated scheme because the isolation between data written using different reclaim unit handles may continue throughout the lifecycle of the data in a storage device.

Although one reclaim group 1118 may be illustrated in FIG. 11, the reclaim units 1114 may be arranged in any number of reclaim groups. In some embodiments, data from reclaim units in different reclaim groups (e.g., valid data from previously referenced reclaim units in different reclaim groups) may be combined in the same reclaim unit.

Any of the storage devices, storage media, and/or the like, disclosed herein may be implemented with any type of nonvolatile storage media based on solid state media, magnetic media, optical media, and/or the like. For example, in some embodiments, a computational storage device may be implemented as an SSD based on not-AND (NAND) flash memory, persistent memory such as cross-gridded nonvolatile memory, memory with bulk resistance change, phase change memory (PCM), and/or the like, or any combination thereof.

Any of the storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached. SCSI (SAS), U.2, and/or the like.

Any of the storage devices disclosed herein may be implemented entirely or partially with, and/or used in connection with, a server chassis, server rack, dataroom, datacenter, edge datacenter, mobile edge datacenter, and/or any combinations thereof.

Any of the hosts disclosed herein may be implemented with any component or combination of components such as a compute server, a storage server, a network server, a cloud server, and/or the like, a node such as a storage node, a computer such as a workstation, a personal computer, a tablet, a smartphone, and/or the like, or multiples and/or combinations thereof.

Any of the communication connections and/or communication interfaces disclosed herein may be implemented with one or more interconnects, one or more networks, a network of networks (e.g., the internet), and/or the like, or a combination thereof, using any type of interface and/or protocol. Examples may include Peripheral Component Interconnect Express (PCIe), NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCS), FibreChannel, InfiniBand, Serial ATA (SATA), Small Computer Systems Interface (SCSI), Serial Attached SCSI (SAS), iWARP, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), and/or the like. Advanced eXtensible Interface (AXI), any generation of wireless network including 2G, 3G, 4G, 5G, 6G, and/or the like, any generation of Wi-Fi, Bluetooth, near-field communication (NFC), and/or the like, or any combination thereof.

Any of the functionality described herein, including any of the host functionality, storage device functionally, and/or the like (e.g., any of the storage device controllers, logic, and/or the like) may be implemented with hardware, software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like and/or any combination thereof, complex programmable logic devices (CPLDs), field programmable gate arrays (FPGAs), application specific circuits (ASICs), central processing units (CPUs) including CISC processors such as x86 processors and/or RISC processors such as ARM processors, graphics processing units (GPUs), neural processing units (NPUs), tensor processing units (TPUs), and/or the like, executing instructions stored in any type of memory. In some embodiments, one or more components may be implemented as a system-on-chip (SOC).

In embodiments implemented at least partially with a storage device having a flash translation layer (FTL) any of the functionality described herein (e.g., any of the storage device controllers, logic, and/or the like) may be implemented at least partially with an FTL.

In some embodiments, a reclaim unit may include physical non-volatile storage that may be reclaimed (e.g., erased, reused, repurposed, and/or the like) as a unit. Depending on the implementation details, a reclaim unit may be reclaimed without disturbing one or more other reclaim units. In some embodiments, a reclaim unit may be implemented as a physical construct only (e.g., may be unrelated to logical addresses or logical block addresses (LBAs).

In some embodiments, a namespace may include a capacity allocated, for example, in one or more reclaim units. A reclaim group may include one or more reclaim units, and one or more placement handles may reference one or more reclaim units (e.g., that may be targeted by one or more I/O commands). In some embodiments, I/O commands performed on one reclaim group may not interfere with the performance, reliability, and/or the like, of commands executed on another reclaim group.

In some embodiments, a placement identifier may specify a reclaim group paired with a placement handle, a reclaim unit handle, and/or the like. a placement identifier may reference a reclaim unit that may be available, for example, for writing random LBAs (e.g., writing user data to the non-volatile storage allocated to the reclaim unit). The written capacity of a reclaim unit referenced by a placement identifier may be incremented in connection with one or more write commands (e.g., incremented on each write command) specifying that placement identifier, placement handle, reclaim unit handle, and/or the like, which, in turn, may be modified to reference another reclaim unit once the capacity of the reclaim unit is partially or fully written.

In some embodiments, a host may track user data (e.g., one or more LBAs of user data) written to one or more reclaim units. Depending on the implementation details, this may enable a host to deallocate some or all user data (e.g., all LBAs) associated with a particular reclaim unit together (e.g., at the same time). Depending on the implementation details, this may reduce or minimize garbage collection by a controller, thereby reducing write amplification. In some embodiments, a host may be responsible for managing placement identifiers, placement handles, reclaim unit handles, and/or other related device resources.

In some embodiments, a reclaim unit handle may include a reference to a reclaim unit (e.g., in each reclaim group) where user data for a write command may be placed. In some embodiments, a reclaim unit referenced by the reclaim unit handle may only be allowed to be referenced by at most one reclaim unit handle. In some embodiments, however, a specific reclaim unit may be referenced by the same or different reclaim unit handles as the reclaim unit is cycled from erased and back into use. When a reclaim unit is written to capacity, a controller may update an associated reclaim unit handle to reference a different reclaim unit that is available for writing user data (e.g., non-volatile storage media that may have been erased prior to writing) and has been written with little or no user data (e.g., an empty reclaim unit).

As stated above, a storage device in accordance with example embodiments of the disclosure may perform a data operation based on a request other than a write command. For example, in some embodiments, a storage device may receive a request for an update operation (e.g., as described with respect to FIG. 3) along with an indication of data locality such as one or more reclaim unit handles to update. In some such embodiments, the storage device may use information about data to be stored in one or more reclaim units referenced by the one or more updated reclaim unit handles to compose and/or select one or more reclaim units to use for the updated reclaim unit handles. For example, the storage device may receive an update request from a host along with a reclaim unit handle to be updated. The host may also send information indicating that data to be stored in a reclaim unit referenced by the reclaim unit handle may be relatively hot data. Thus, the storage device may compose and/or select a reclaim unit having a relatively large number of remaining P/E cycles and update the reclaim unit handle to point to the reclaim unit that is composed and/or selected based on the information received from the host. In some such embodiments, the storage device may preserve a data isolation scheme (e.g., an initial isolation scheme and/or a persistent isolation scheme as described herein).

Figure 12:
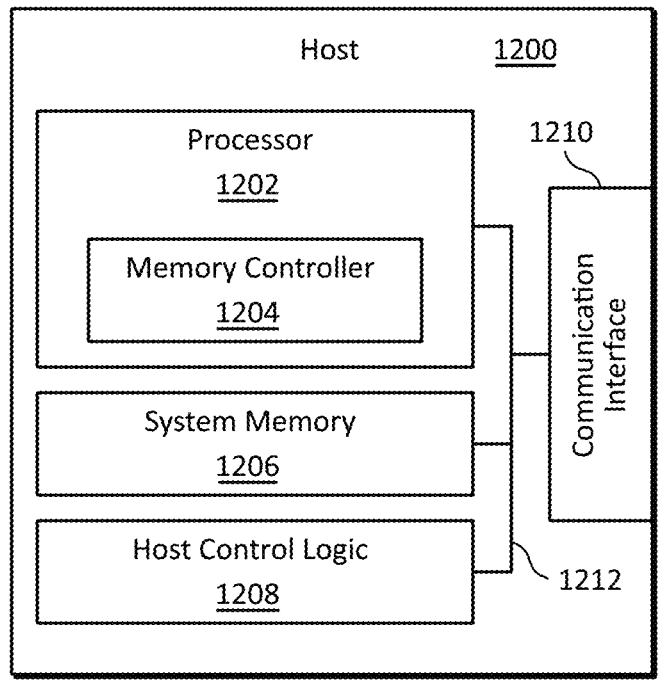
FIG. 12 illustrates an example embodiment of a host apparatus that may be used to implement any of the host functionality disclosed herein in accordance with example embodiments of the disclosure.

FIG. 12 illustrates an example embodiment of a host apparatus that may be used to implement any of the host functionality disclosed herein in accordance with example embodiments of the disclosure. The host apparatus 1200 illustrated in FIG. 12 may include a processor 1202, which may include a memory controller 1204, a system memory 1206, host control logic 1208 (which may be used to implement. for example, the placement logic 963 illustrated in FIG. 9), and/or a communication interface 1210. Any or all of the components illustrated in FIG. 12 may communicate through one or more system buses 1212. In some embodiments, one or more of the components illustrated in FIG. 12 may be implemented using other components. For example, in some embodiments, the host control logic 1208 may be implemented by the processor 1202 executing instructions stored in the system memory 1206 or other memory.

Figure 13:
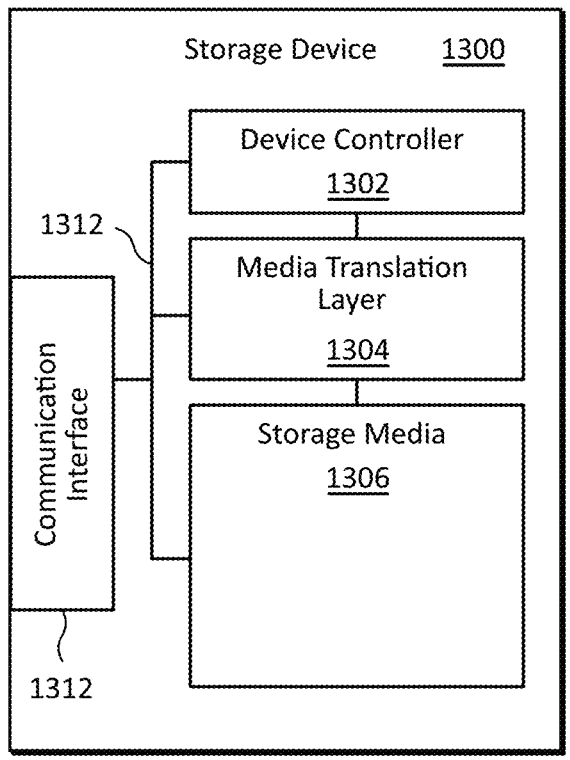
FIG. 13 illustrates an example embodiment of a storage device that may be used to implement any of the storage device functionality disclosed herein in accordance with example embodiments of the disclosure.

FIG. 13 illustrates an example embodiment of a storage device that may be used to implement any of the storage device functionality disclosed herein in accordance with example embodiments of the disclosure. The storage device 1300 may include a device controller 1302 (which may be used to implement, for example, the reclaim unit logic 965 illustrated in FIG. 9), a media translation layer 1304 (e.g., an FTL), storage media 1306, and/or a communication interface 1310. The components illustrated in FIG. 13 may communicate through one or more device buses 1312. In some embodiments that, may use flash memory for some or all of the storage media 1306, the media translation layer 1304 may be implemented partially or entirely as a flash translation layer (FTL).

Figure 14:
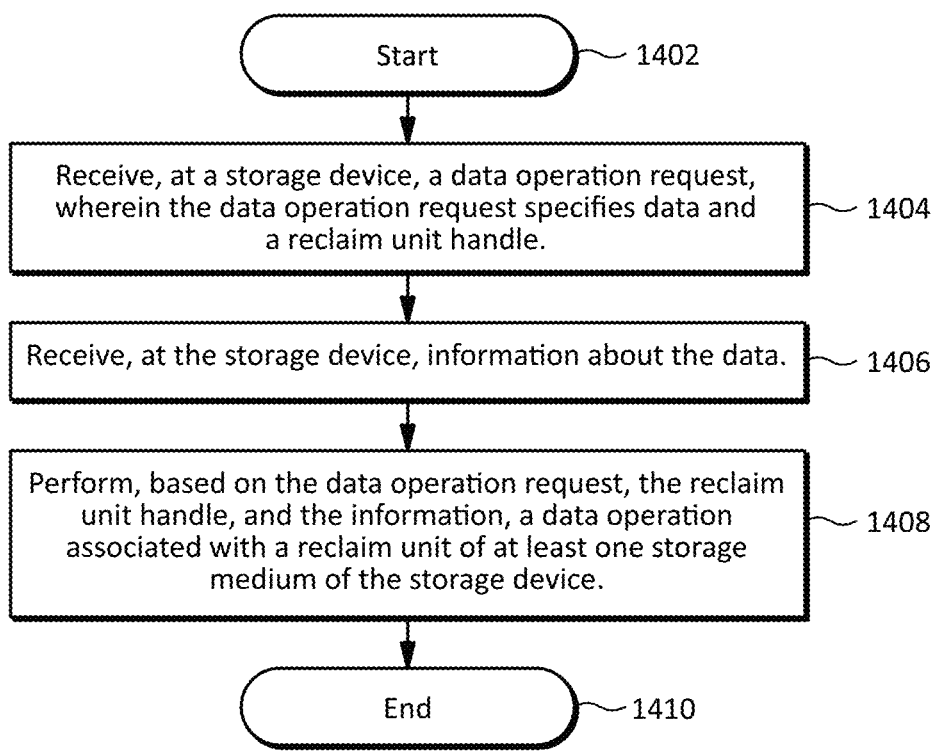
FIG. 14 illustrates an embodiment of a method for flexible data placement for a storage device in accordance with example embodiments of the disclosure.

FIG. 14 illustrates an embodiment of a method for flexible data placement for a storage device in accordance with example embodiments of the disclosure. The method may begin at operation 1402.

At operation 1404, the method may receive, at a storage device, a data operation request, wherein the data operation request specifies data and a reclaim unit handle. For example, a data operation request may include a request for a write operation, a copy operation, a deallocate operation, a sanitize operation, an erase operation, a format operation, a compare and write operation, and/or the like. In some example embodiments, a data operation request may include a write command such as write commands 330, 530, and/or 930 as illustrated in FIG. 3, FIG. 5, and/or FIG. 9.

At operation 1406, the method may receive, at the storage device, information about the data. Information about the data may include one or more of access information, information about one or more acceptable characteristics of storage media used to implement a reclaim unit for the data, information about one or more attributes of data to store in the device, information about a type and/or usage of data to be stored, and/or the like. In some example embodiments, information about the data (e.g., information 861 and/or 961) may be received by a storage device 804 and/or 904 as illustrated in FIG. 8 and/or FIG. 9.

At operation 1408, the method may perform, based on the data operation request, the reclaim unit handle, and the information, a data operation associated with a reclaim unit of at least one storage medium of the storage device. For example, as illustrated in FIG. 8, information 861 may indicate that data to be stored may be relatively cold data that may be stored in a reclaim unit including erase blocks having relatively high P/E cycle counts. The method may end at operation 1410.

The embodiment illustrated in FIG. 14, as well as all of the other embodiments described herein, are example operations and/or components. in some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. A reference to a component or element may refer to one or more of the component or element, and a reference to plural components or elements may refer to a single component or element. For example, a reference to a resource may refer to one more resources, and a reference to resources may refer to a single resource. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A storage device comprising:
   at least one storage medium; and
   a controller configured to:
      receive a write command, wherein the write command specifies data and a reclaim unit handle referencing a first reclaim unit and a second reclaim unit;
      receive information about the data;
      compose the first reclaim unit of the at least one storage medium with a first block based on the first block having a first characteristic;
      compose the second reclaim unit of the at least one storage medium with a second block based on the second block having a second characteristic different from the first characteristic; and
      store the data in one of the first reclaim unit or the second reclaim unit,
   wherein at least one of the first characteristic or the second characteristic is related to at least one of a bit error rate, a bit error accumulation, a length of time the data is stored, a number of read operations performed on the data, a number of re-write operations, a number of remaining program/erase cycles, a number of movement operations performed on the data, or an expected lifetime.

2. The storage device of claim 1, wherein the information comprises access information.

3. The storage device of claim 1, wherein the information comprises error tolerance information.

4. The storage device of claim 1, wherein the information comprises data attribute information.

5. The storage device of claim 1, wherein the information comprises a type of data including at least one of infrequently accessed data or peripherally sensitive data, and
   wherein at least one of the first block or the second block is selected based on at least one of the first characteristic and the second characteristic accommodating the type.

6. The storage device of claim 1, wherein the controller is configured to determine the information based, at least in part, on the reclaim unit handle.

7. The storage device of claim 1, wherein the controller is configured to:
- receive an indicator that is separate from the reclaim unit handle; and
- determine the information based, at least in part, on the indicator.

8. The storage device of claim 1, wherein the controller is configured to select the reclaim unit based on the information.

9. The storage device of claim 8, wherein the controller is configured to select the reclaim unit based on a characteristic of at least a portion of the reclaim unit.

10. The storage device of claim 1, wherein the number of movement operations includes a number of garbage collection operations.

11. The storage device of claim 1, wherein the expected lifetime includes a number of erase blocks used in the reclaim unit.

12. The storage device of claim 1, wherein the controller is configured to compose the reclaim unit based on the information.

13. The storage device of claim 12, wherein the controller is configured to compose the reclaim unit based on a characteristic of at least a portion of the reclaim unit.

14. The storage device of claim 13, wherein the number of movement operations includes a number of garbage collection operations.

15. The storage device of claim 13, wherein the expected lifetime includes a number of erase blocks used in the reclaim unit.

16. An apparatus comprising:
a processor configured to:
- send, to a storage device, a write command, wherein the write command specifies data and a reclaim unit handle, wherein the reclaim unit handle is to reference a first reclaim unit and a second reclaim unit in at least one storage medium of the storage device; and
- send, to the storage device, information about the data, wherein the first reclaim unit in the at least one storage medium is composed with a first block based on the first block having a first characteristic and the second reclaim unit of the at least one storage medium is composed with a second block based on the second block having a second characteristic different from the first characteristic, wherein at least one of the first characteristic or the second characteristic is related to at least one of a bit error rate, a bit error accumulation, a length of time the data is stored, a number of read operations performed on the data, a number of re-write operations, a number of remaining program/erase cycles, a number of movement operations performed on the data, or an expected lifetime.

17. The apparatus of claim 16, wherein the information comprises access information.

18. A method comprising:
- receiving, at a storage device, a data operation request, wherein the data operation request specifies data and a reclaim unit handle referencing a first reclaim unit and a second reclaim unit;
- receiving, at the storage device, information about the data;
- composing the first reclaim unit of the storage device with a first block based on the first block having a first characteristic;
- compose the second reclaim unit of the at least one storage medium with a second block based on the second block having a second characteristic different from the first characteristic; and
- performing, based on the data operation request, a data operation associated with at least one of the first reclaim unit or the second reclaim unit,
- wherein at least one of the first characteristic or the second characteristic is related to at least one of a bit error rate, a bit error accumulation, a length of time the data is stored, a number of read operations performed on the data, a number of re-write operations, a number of remaining program/erase cycles, a number of movement operations performed on the data, or an expected lifetime.

19. The method of claim 18, wherein the data operation request comprises a write operation request and the data operation comprises a write operation.

20. The method of claim 19, wherein the write operation request comprises a write command and the write operation comprises storing, based on the reclaim unit handle and the information, the data in the reclaim unit.

* * * * *